United States Patent
Shah et al.

(10) Patent No.: US 12,450,827 B2
(45) Date of Patent: Oct. 21, 2025

(54) TECHNIQUE FOR DYNAMICALLY ADAPTING AN EXPOSURE VALUE IN INTERACTIVE RENDERING

(71) Applicant: Siemens Healthineers AG, Forchheim (DE)

(72) Inventors: Rishabh Shah, Wentworth Point (AU); Kaloian Petkov, Lawrenceville, NJ (US); Christoph Vetter, Hopewell, NJ (US)

(73) Assignee: Siemens Healthineers AG, Forchheim (DE)

( * ) Notice: Subject to any disclaimer, the term of this patent is extended or adjusted under 35 U.S.C. 154(b) by 168 days.

(21) Appl. No.: 18/404,953

(22) Filed: Jan. 5, 2024

(65) Prior Publication Data

US 2024/0257448 A1    Aug. 1, 2024

(30) Foreign Application Priority Data

Jan. 30, 2023    (EP) ..................... 23153902

(51) Int. Cl.
*G06T 15/50*    (2011.01)
*G06T 15/06*    (2011.01)
*G06T 15/08*    (2011.01)

(52) U.S. Cl.
CPC ............ *G06T 15/506* (2013.01); *G06T 15/06* (2013.01); *G06T 15/08* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 8,884,959 B2 | 11/2014 | Desgranges et al. | |
| 10,665,007 B2 | 5/2020 | Petkov et al. | |
| 10,893,262 B2 | 1/2021 | Vetter et al. | |
| 2013/0281303 A1* | 10/2013 | Short | C07K 16/005 506/1 |
| 2014/0031603 A1* | 1/2014 | Robar | A61B 6/06 600/1 |
| 2014/0286644 A1* | 9/2014 | Oshima | H04B 10/11 398/118 |

(Continued)

OTHER PUBLICATIONS

Zhang, Yubo, and Kwan-Liu Ma. "Lighting design for globally illuminated vol. rendering." IEEE transactions on visualization and computer graphics 19.12 (2013): 2946-2955. (Year: 2013).*

(Continued)

*Primary Examiner* — Nurun Flora

(57) ABSTRACT

An exposure value is dynamically adapted for consistent interactive rendering of a volumetric medical dataset. A rendering set of a plurality of rendering types with each rendering type adapted for providing an image dataset derived from the volumetric medical dataset is provided. An image dataset according to a first rendering type using a first exposure value is output. An exposure value for each rendering type within the rendering set is determined based on the first exposure value of the first rendering type and on a consistency requirement for changing rendering types of the image dataset output. Upon receiving a user input for modifying the output of the image dataset, a second rendering type with a second exposure value is selected and output.

20 Claims, 5 Drawing Sheets

(56) References Cited

U.S. PATENT DOCUMENTS

2021/0279942 A1 9/2021 Petkov et al.
2022/0358627 A1 11/2022 Deng et al.

OTHER PUBLICATIONS

P. Devebec, "Image-based Lighting," in ACM SIGGRAPH 2006 Courses, 2006.
M. Čadik, M. Wimmer, L. Neumann and A. Artusi, "Evaluation of HDR tone mapping methods using essential perceptual attributes," Computers and Graphics, vol. 32, No. 3, pp. 330-349, 2008.
G. Krawczyk, K. Myszkowski and H.-P. Seidel, "Perceptual Effects in Real-time Tone Mapping," in SCCG '05: Proceedings of the 21st Spring Conference on Computer Graphics, 2005.
X. Yuan, M. X. Nguyen, B. Chen and D. H. Porter, "HDR VolVis: High Dynamic Range Volume Visualization," IEEE Transactions on Visualization and Computer Graphics, vol. 12, No. 4, pp. 433-445, 2006.
J. Zhou, X. Wang, H. Cui, P. Gong, X. Miao, Y. Miao, C. Xiao, F. Chen and D. Feng, "Topology-aware Illumination Design for Volume Rendering," BMC Bioinformatics, vol. 17, p. 309, 2016.
Y. Zhang and K.-L. Ma, "Lighting Design for Globally Illuminated vol. Rendering," IEEE Transactions on Visualization and Computer Graphics, vol. 19, No. 12, pp. 2946-2955, 2013.
M. M. Loper and M. J. Black, "OpenDR: An Approximate Differentiable Renderer," Proceedings of ECCV, vol. 8695, pp. 154-169, 2014.
S. Zhao, W. Jakob and T.-M. Li, "Physics-based differentiable rendering: from theory to implementation," SIGGRAPH Courses, 2020.
S. Weiss and R. Westermann, "Differentiable Direct Volume Rendering," IEEE Transactions on Visualization and Computer Graphics, vol. 28, No. 1, pp. 562-572, 2021.
D. Jönsson, E. Sunden, A. Ynnerman and T. Ropinski, "A Survey of Volumetric Illumination Techniques," Computer Graphics Forum, vol. 33, No. 1, pp. 27-51, 2014.
E. Dappa, K. Higashigaito, J. Fornaro, S. Leschka, S. Wildermuth and H. Alkadhi, "Cinematic rendering—an alternative to volume rendering for 3D computed tomography imaging," Insights into Imaging, vol. 7, No. 6, pp. 849-856, 2016.
T. Kroes, "Exposure Render: An Interactive Photo-Realistic Volume Rendering Framework," PLOS ONE, vol. 8, No. 4, 2012.
C. R. Alla Chaitanya, A. Kaplanyan, C. Schied, M. Salvi, A. Lefohn, D. Nowrouzezahrai and T. Aila, "Interactive Reconstruction of Monte Carlo Image Sequences using a Recurrent Denoising Autoencoder," ACM Transactions on Graphics, vol. 36, No. 4, pp. 98: 1-98: 12, 2017.
T. Müller, B. McWilliams, F. Rousselle, M. Gross and J. Novak, "Neural Importance Sampling," ACM Transactions on Graphics, vol. 38, No. 5, pp. 145:1-145:19, 2019.
J. Kniss, S. Premoze, C. Hansen, P. Shirley and A. McPherson, "A Model for Volume Lighting and Modeling," IEEE Transactions on Visualization and Computer Graphics, vol. 9, No. 2, pp. 150-162, 2003.
T. Ropinski, C. Döring and C. Rezk-Samala, "Interactive volumetric lighting simulating scattering and shadowing," IEEE Pacific Visualization Symposium (PacificVis), 2010, pp. 169-176, doi: 10.1109/PACIFICVIS.2010.5429594.
Thomas Kroes et al: "Exposure Render: An 1-19 Interactive Photo-Realistic vol. Rendering Framework", PLOS ONE, vol. 7, No. 7, Jul. 2, 2012 (Jul. 2, 2012), pp. 1-10.
Narkowicz Krysztof: "Automatic Exposure", Jan. 9, 2016 (Jan. 9, 2016), pp. 1-8, XP93054753, Retrieved from the I~ternet: URL:https://knarkowicz.wordpress.com/2016/01/09/automatic-exposure/.
Hanqi Guo et al: "Multi-dimensional transfer function design based on flexible dimension projection embedded in parallel coordinates", Pacific Visualization Symposium (PACIFICVIS), 2011 IEEE, IEEE, Mar. 1, 2011 (Mar. 1, 2011), pp. 19-26.
Liu Ziyi: "A review for Tone-mapping Operators on Wide Dynamic Range Im.age" Jan. 8, 2021 (Jan. 8, 2021), pp. 1-7.
Extended European Search Report (EESR) mailed Jun. 29, 2023 in corresponding European Patent Application No. 23153902.4.

\* cited by examiner

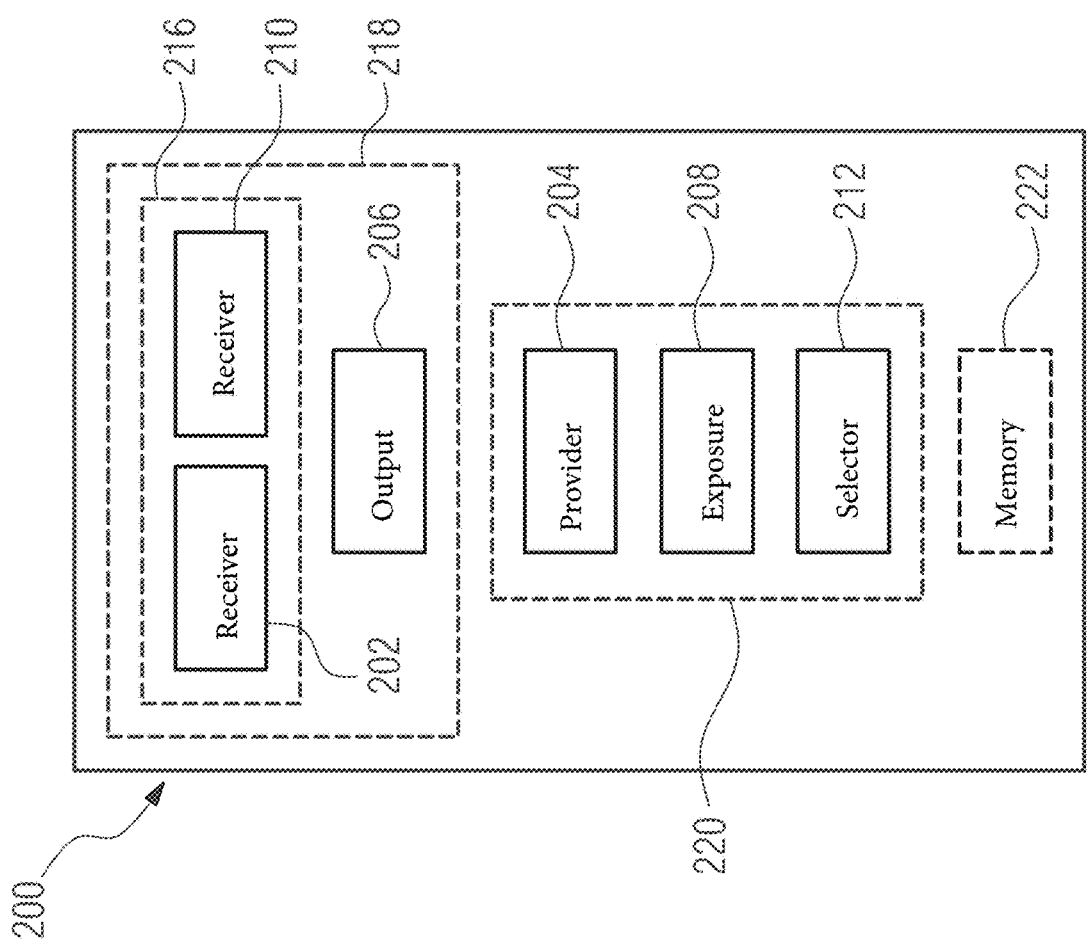
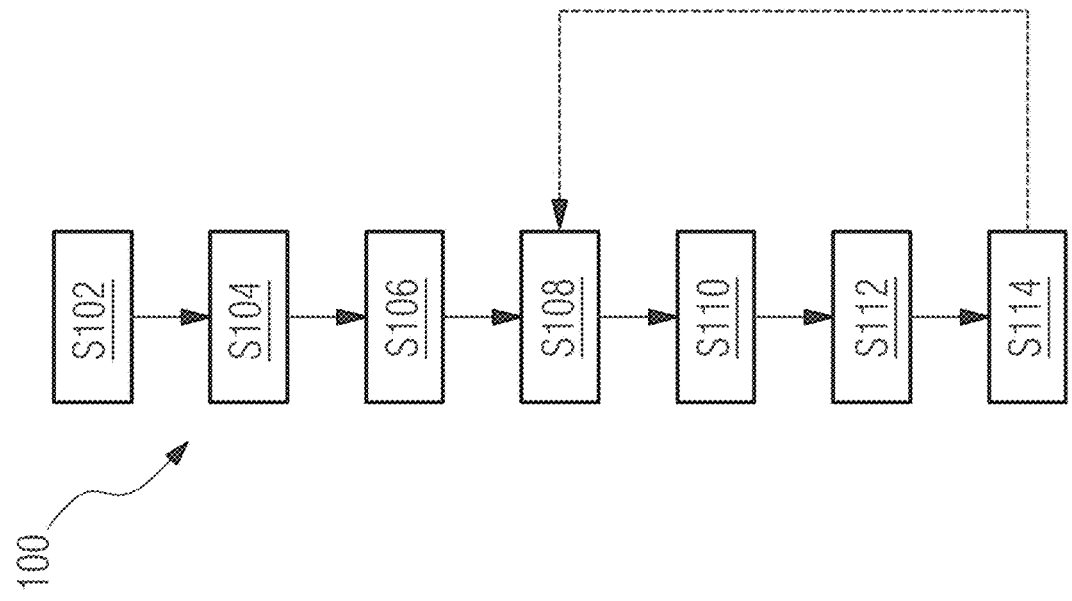

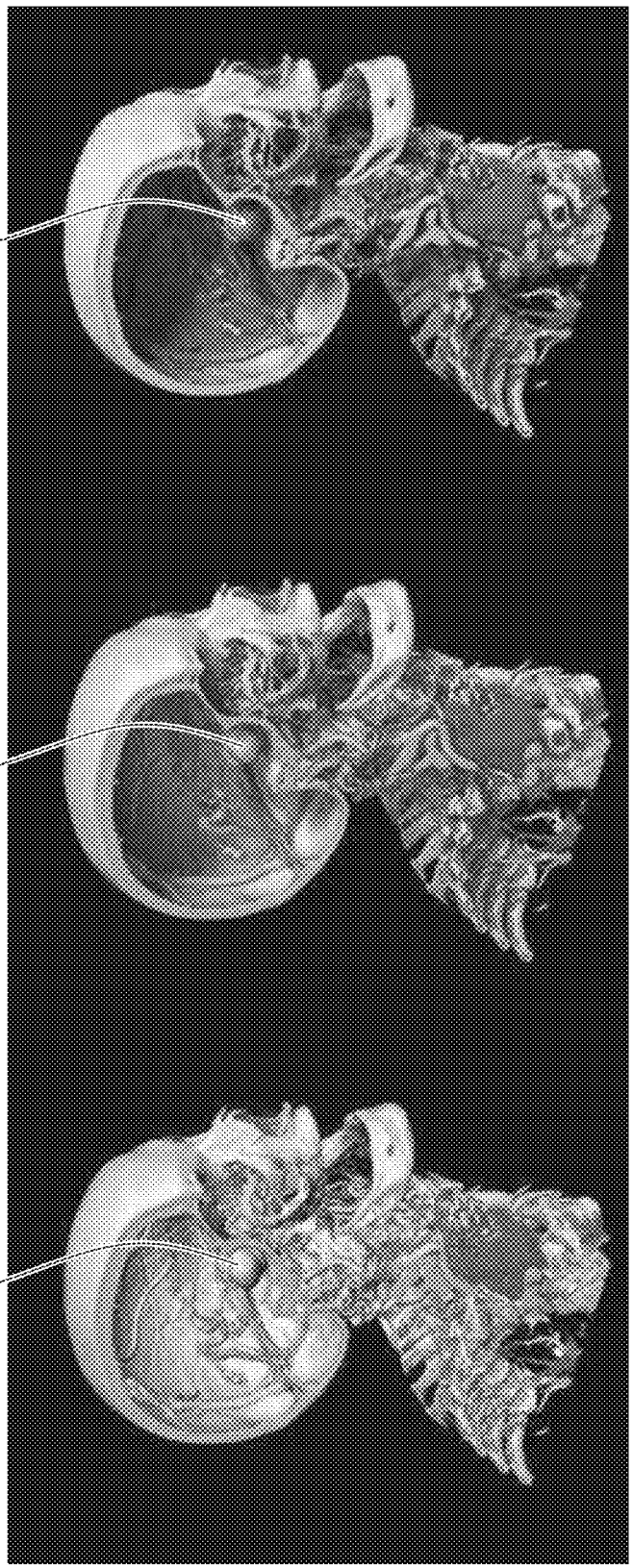

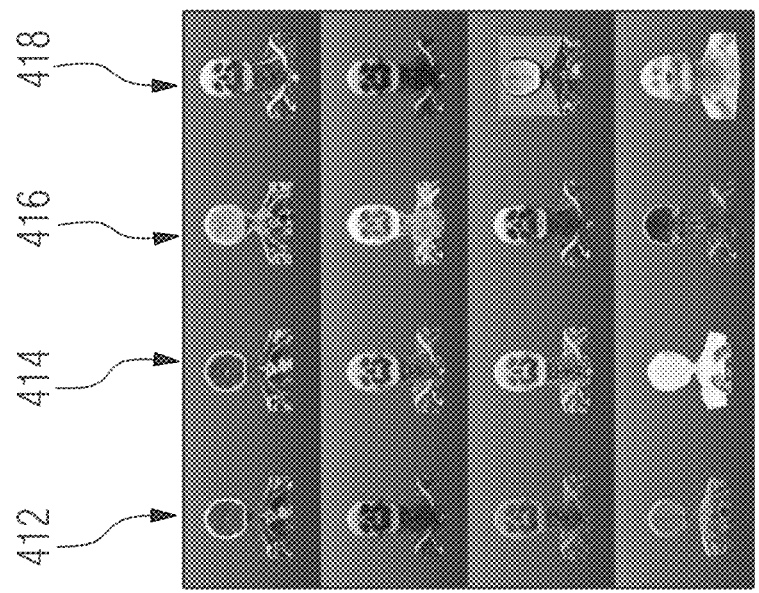
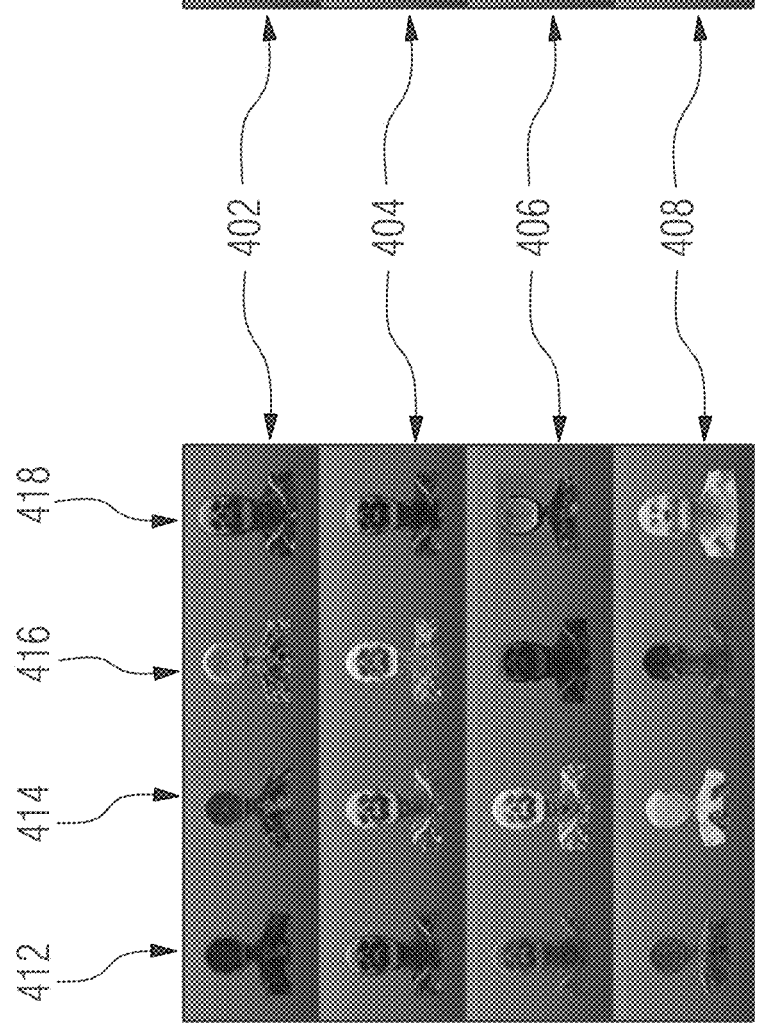

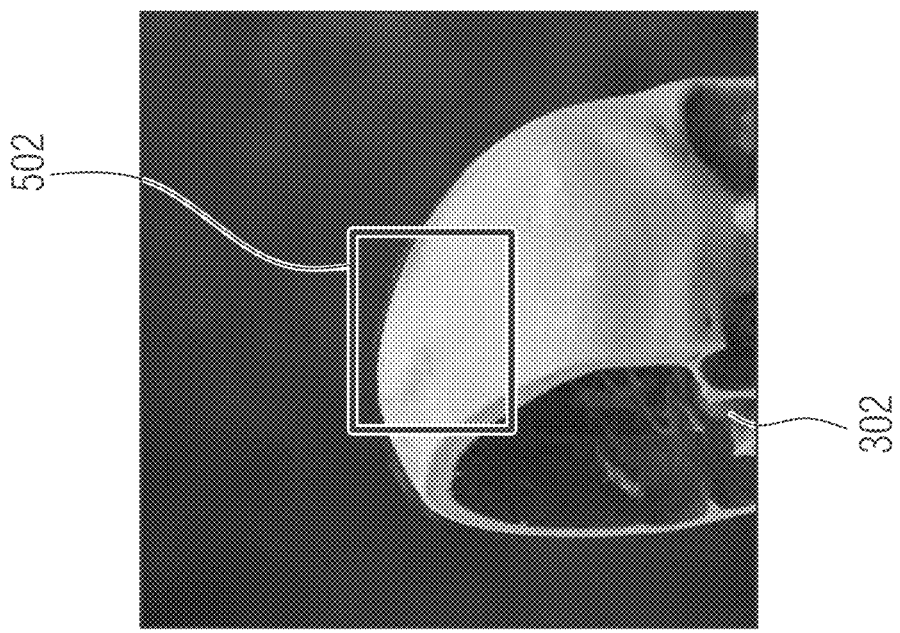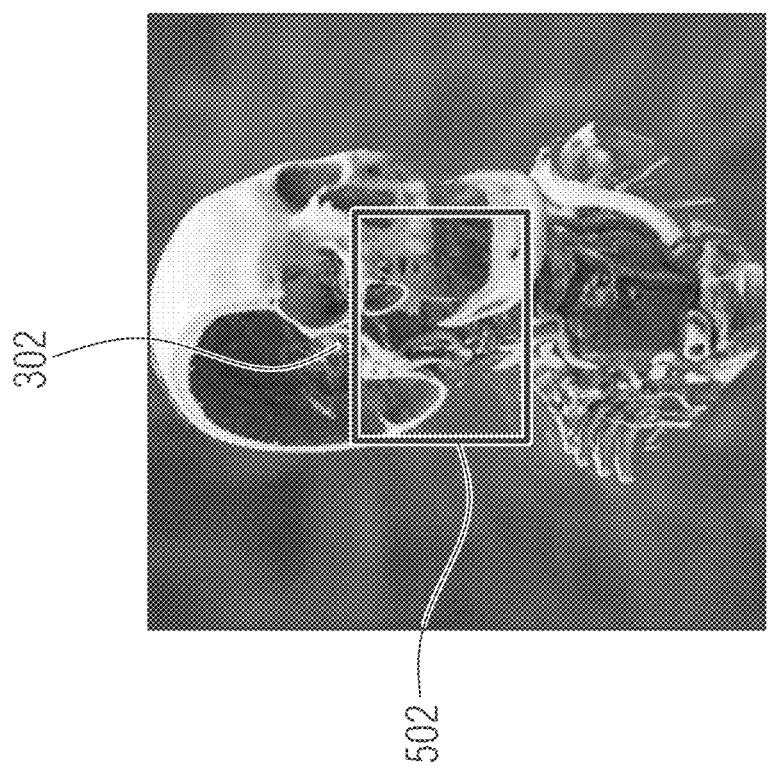

TECHNIQUE FOR DYNAMICALLY ADAPTING AN EXPOSURE VALUE IN INTERACTIVE RENDERING

RELATED APPLICATION

This application claims the benefit of EP 23153902.4, filed on Jan. 30, 2023, which is hereby incorporated by reference in its entirety.

BACKGROUND

Photorealistic rendering pipelines employ high dynamic range (HDR) lighting computations that mimic the behavior of light in the real world. That often involves image-based lighting from high dynamic range photographs. Just as the human eye can only perceive a limited dynamic range at any one time and uses complex adaptation, the display pipeline conventionally applies a tone mapping operator for displaying the HDR image on low dynamic range (LDR) displays, including exposure compensation curves for real-time applications. Specifically for high dynamic range medical imaging data, a tone mapping operator may also be applied as part of a transfer function during rendering.

There exists a class of lighting design techniques that attempt to compute optimized light placement based on properties of a scene. The topological features of a contour tree derived from volume data may be used to compute a lighting transfer function that maximizes the perceptual difference of structures in the image. An optimized three-point lighting environment may be generated under global illumination, where the light setup uses principal component analysis of screen-space normals together with the mean and variance of accumulated opacity from a volume raycasting pre-pass. This is followed by a tone mapping operator which enhances the contrast in shadowed areas.

Differentiable rendering (DR) models the explicit relationship between rendering parameters and resulting images in conventional image synthesis. DR obtains image-space derivatives with respect to rendering parameters, which can be used in a variety of gradient-based optimization methods to solve inverse rendering problems or to compute the loss for training machine learning (ML) models directly in the space of rendered images. While many conventional differentiable renderers such as OpenDR are limited to simple surface rendering and local shading, there are examples for photorealistic surface and participating media rendering, and more recently, for direct volume rendering. While auto-exposure can be formulated as an optimization process on an objective function, the increased computational cost is conventionally not suitable for real-time applications.

Volume rendering spans a wide variety of algorithms, which support different visual effects and may pose different computational challenges. Two classes of algorithms are distinguished, namely local illumination and global illumination.

For local illumination, the shading at each voxel considers only the optical properties at that voxel. Phong shading or similar shading may be used to simulate various lighting conditions. FIG. 3A shows an exemplary medical image from volumetric data, in which conventional (e.g., volume) raycasting with local illumination only is applied.

For global illumination, lighting simulation is used to enable photorealistic effects, in particular shadows, ambient occlusions, reflection, refraction, color bleeding, light scattering, and/or caustics. FIGS. 3B and 3C each show an exemplary medical image from the same volumetric data as in FIG. 3A. In FIG. 3B, raycasting with approximate global illumination (e.g., using interactive volume lighting, IVL) is applied. In FIG. 3C, conventional (in particular, offline) volumetric Monte Carlo path tracing is applied.

The medical images in FIGS. 3A, 3B and 3C differ in terms of the amount by which a potentially relevant anatomical structure (e.g., an aneurysm) 302 is highlighted. Alternatively, or in addition, the algorithms used for generating the medical images in FIGS. 3A, 3B and 3C differ in the amount of photorealism they can produce. The amount of photorealism may be linked to the depth and/or shape perception of a user. Alternatively, or in addition, the amount of photorealism may be linked to the mental effort required (e.g., the user may need to rotate the camera to understand 3D shapes from motion parallax in FIG. 3A, in particular rather than the shadowing in FIGS. 3B and 3C).

E.g., the spatial relationships between the brain aneurysm 302 and the vessels are easier to understand from FIGS. 3B and 3C than from FIG. 3A due to the shadows.

Generally, the conspicuity of a specific structure (e.g., the aneurysm 302) may be more directly affected by the lighting design. However, in the example of FIGS. 3A, 3B and 3C, all three medical images use an identical lighting setup.

Conventional volume visualization methods based on raycasting, which are still used in many current advanced visualization medical products, simulate only the emission and absorption of radiant energy along the primary viewing rays through the volume data. The emitted radiant energy at each point is absorbed according to the Beer-Lambert law along the ray to the observer location with absorption coefficients derived from the patient data. Renderers conventionally compute shading using only the standard local shading models at each point along the ray (e.g., the Blinn-Phong model), based on the local volume gradients (local illumination). While fast, these methods do not simulate the complex light scattering and extinction associated with photorealism (global illumination).

(E.g., volumetric) Monte Carlo path tracing is a global illumination algorithm, which solves the rendering equation using Monte Carlo integration. Monte Carlo path tracing can produce highly realistic images, including for medical visualization. At the same time, the computational requirements are conventionally very high since hundreds to thousands of discrete light paths need to be simulated at each pixel. As more and more paths are simulated, the solution converges on an accurate estimation of the irradiance at each point for incoming light from all directions. The renderer employs a hybrid of volumetric scattering and surface-like scattering, modeled by phase functions and bidirectional reflectance distribution functions (BRDFs), respectively, based on properties derived from the anatomical data. Producing a single image may take on the order of minutes, and it is conventionally not suitable for real-time rendering at full quality. A variety of algorithms address the performance challenges, including irradiance caching (which, e.g., requires long pre-computation on lighting changes before real-time rendering is possible), artificial intelligence (AI)-based denoising and light path generation.

At the other end of the global illumination spectrum are real-time techniques that support a subset of the global illumination effects. Half-angle slicing simulates light propagation for a directional light source along consecutive slices along the light direction. At each lighting slice, the volume opacity attenuates the incoming light from the previous slice, and this process executes in lock act with the slice-based volume rendering, which composites slices aligned along the half-angle between the viewing direction and the light source direction. The technique supports hard and soft shadows and forward-only light scattering at real-time rates.

The different rendering algorithms are conventionally utilized on a one-by-one basis, with the corresponding exposure value computed independently for each rendering algorithm, leading to disadvantageous sharp and inconsistent changes in luminosities of a displayed image dataset upon changing of rendering algorithms.

SUMMARY AND DETAILED DESCRIPTION

It is therefore an object to provide a technique for dynamically adapting an exposure value such that user input induced changes, and/or transitions, in the rendering (and/or output for display) of image datasets originating from volumetric medical datasets are smooth, consistent, and coherent.

This object is solved by a method for dynamically adapting an exposure value for consistent interactive rendering of a volumetric medical dataset, by a computing device, by a system comprising the computing device, and by a computer program (non-transitory computer readable storage medium and/or computer program product). Advantageous aspects, features and embodiments are described in the claims and in the following description together with advantages.

In the following, the solution is described with respect to the claimed method as well as with respect to the claimed computing device and system comprising the computing device. Features, advantages, or alternative embodiments herein can be assigned to the other claimed objects (e.g., the computer program or a computer program product), and vice versa. In other words, claims for the computing device and system comprising the computing device can be improved with features described or claimed in the context of the method. In this case, the functional features of the method are embodied by structural units of the system and vice versa, respectively.

As to a method aspect, a computer-implemented method for dynamically adapting an exposure value for consistent interactive rendering of a volumetric medical dataset is provided. The method includes an act of receiving a volumetric medical dataset. The method further includes an act of providing a rendering set. The rendering set includes a plurality of rendering types (e.g., including rendering algorithms, classifications of anatomical structures within the volumetric medical dataset, and/or rendering presets). Each rendering type within the rendering set is adapted for providing an image dataset derived from the received volumetric medical dataset. The plurality of rendering types includes at least two different rendering types. The method further includes an act of outputting, to a display device, an image dataset pertaining to the received volumetric medical dataset according to a first rendering type within the rendering set. The outputting includes applying a first exposure value to the image dataset. The method further includes an act of determining an (e.g., separate) exposure value for each (in particular different from the first) rendering type within the rendering set. The exposure value is adapted for displaying the image dataset according to the (e.g., respective) rendering type on a display device. The exposure value for each rendering type is determined based on the first exposure value according to the first rendering type. The determining of the exposure value for each rendering type is based on a consistency (and/or smoothness, and/or coherency) requirement for changing rendering types of the image dataset output. The method further includes an act of receiving a user input (e.g., via a graphical user interface, GUI) for modifying the output of the image dataset. The method further includes an act of selecting, based on the received user input, a second rendering type with a determined second exposure value for outputting the image dataset pertaining to the received volumetric medical dataset. The second rendering type differs from the first rendering type. The method still further includes an act of outputting, to the display device, the image dataset according to the selected second rendering type with the determined (e.g., respective) second exposure value.

By the technique, the lighting environment, which may use high dynamic range (HDR) image-based lighting in addition to synthetic light sources, does not need to be modified, and instead an anatomical context can be leveraged to dynamically select and adapt the exposure value (also denoted as exposure parameter, brightness value, and/or brightness parameter) for each rendering type, e.g., for a simple tone mapping operator. Both screen-space analysis and ray-space analysis, either individually or combined, can be employed during volume rendering (which may include, or may be identical to, providing an image dataset according to a rendering type with an associated, and/or respective, exposure value for display) to handle the volumetric properties of the data.

The technique primarily implements dedicated auto-exposure using real-time image analysis, and/or heuristics, based on the output of conventional rendering techniques. Alternatively, or in addition, aspects of the technique related to machine intelligence (and/or machine learning, ML, and/or artificial intelligence, AI) and scene understanding can be applied to auto-exposure based on differentiable volume rendering.

Exemplary embodiments of the technique implement a hybrid rendering approach, where various rendering algorithms are combined as part of the workflow [18]. Given that the global illumination algorithms account for light occlusion, and therefore produce images with significantly higher dynamic range, the technique can handle the rendering algorithm changes explicitly to produce a consistent exposure of the 3D scene.

The volumetric medical dataset may include a dataset encoding information about a three-dimensional spatial volume. Alternatively, or in addition, the volumetric medical dataset may include temporal information. E.g., the volumetric medical dataset may be four dimensional with three spatial dimensions and one time-like dimension.

The volumetric medical dataset may be received, and/or obtained, from a medical scanner (briefly: scanner). The medical scanner may include a magnetic resonance imaging (MRI) scanner, a computed tomography (CT) scanner, an X-ray scanner (also denoted as radiograph), an ultrasound (US) scanner, an echocardiograph, a positron emission tomography (PET) device, and/or a single-photon emission computed tomography (SPECT) scanner.

A rendering type may include a rendering algorithm. Two or more rendering algorithms may differ in their (in particular physical) accuracy, granularity and/or speed. E.g., a slow rendering algorithm may produce physically accurate medical images, and/or medical images with a fine granularity (also: high resolution). The physical accuracy may include an (e.g., global) illumination, and/or (e.g., global) lighting effects. Alternatively, or in addition, a fast rendering algorithm may be limited in the (in particular) physical accuracy of the medical image, and/or in the granularity. E.g., a fast rendering algorithm may produce medical images at low resolution, and/or with only local illumination taken into account.

Alternatively, or in addition, in the terminology of Monte-Carlo based path tracing, physically accurate rendering may use an unbiased Monte Carlo estimator. Further alternatively, or in addition, a biased estimator may sacrifice physical accuracy for speed. Still further alternatively, or in addition, the fast rendering may use an alternative method for computing global illumination, such as half-angle slicing and/or interactive volume lighting (IVL).

All of the above (e.g., unbiased Monte Carlo estimator, biased estimator, half-angle slicing, and/or IVL) may refer to determining (and/or computing) global illumination lighting effects. Alternatively, or in addition, the terminology "unbiased Monte Carlo path tracing" (briefly: Monte Carlo path tracing) may be adopted for high quality global illumination, and/or the terminology "raycasting with approximate global illumination" (briefly: raycasting) may be adopted for fast determining of global illumination effects at the cost of reduced physical accuracy.

Local illumination may include taking, e.g., only, into account shading properties of a voxel of the volumetric medical dataset for determining the shading of the voxel (and/or the pixel).

Alternatively, or in addition, local illumination may determine (e.g., compute) the shading using only properties at the current voxel, such as optical color and/or opacity from the voxel classification and/or voxel gradients.

Further alternatively, or in addition, screen-space shading techniques that leverage properties at nearby rendered (and/or displayed) pixels may be applied (e.g., in contrast to the volume rendering applicable, or/or applied, to voxels). Screen-space techniques for approximate global illumination may include, e.g., screen-space reflections, and/or screen-space ambient occlusions.

Global illumination may include taking into account shading properties from all (or at least an extended subset of all) voxels of the volumetric medical dataset for determining the shading of a voxel (and/or a pixel). Alternatively, or in addition, global illumination may take into account shadows, ambient occlusions, reflections, refraction, color bleeding, (in particular multiple) light scattering, and/or caustics. In particular, shadows and/or ambient occlusion may contribute to photorealistic rendering.

The shading of a voxel (and/or pixel) may alternatively also be denoted as the (e.g., assigned) brightness (and/or exposure) of the voxel (and/or pixel).

Alternatively, or in addition, a rendering type may include a classification, in particular of a selection of an anatomical structure, and/or of a tissue type, captured in the volumetric medical dataset to be displayed on the medical image. E.g., a rendering type may include selecting to highlight, and/or show blood vessels on the medical image. Alternatively, or in addition, a rendering type may include selecting to highlight, and/or show muscle fibers and/or ligaments, on the medical Image.

Further alternatively, or in addition, a rendering type may include a selection of rendering presets (briefly: presets; also: rendering settings, or briefly: settings; also: rendering parameters). The presets and/or settings may include a camera view (also denoted as user view, viewpoint of the user, and/or camera position), a light source profile, a clipping plane, and/or a windowing (also denoted as rendering window).

The camera view may include an orientation of a two-dimensional projection relative to the volume of the volumetric medical dataset. Alternatively, or in addition, the light source profile may include an internal light source (e.g., a point-like light source located within the volume of the volumetric medical dataset, in particular within an anatomical structure captured in the volumetric medical dataset), and/or an external light source, e.g., a planar light source and/or a point-like light source located along one direction outside the volume of the volumetric medical dataset. Further alternatively, or in addition, the clipping plane may include clipping (and/or cutting out) from the output image dataset, e.g., part of, an anatomical structure (e.g., clipping part of the skull in order to provide a view onto the brain).

Still further alternatively, or in addition, the windowing may include selecting a range of scalar values associated with the voxels (and/or pixels) of the volumetric medical dataset to be output, and/or displayed, on the display device. Alternatively, or in addition, a window may include an interval, and/or a range, in particular of scalar values associated with the voxels. Further alternatively, or in addition, windowing may be part of, and/or may be included in, a voxel classification.

Still further alternatively, or in addition, 'windowing' may refer (e.g., uniformly) to the radiology workflow act of selecting the range of scalar values that will be mapped to visible values in the (e.g., final and/or output) image dataset (briefly: image). Alternatively, or in addition, the 'windowing' may be part of the voxel classification.

Zooming into the (e.g., output) image (and/or image dataset) may be handled as part of the camera preset and/or viewing preset.

The one or more scalar values may e.g., refer to the pixel intensity, and/or voxel intensity, in the medical image (briefly: image; also: image dataset). E.g., in CT imaging, the values are conventionally provided, and/or measured, in Hounsfield units (and/or also denoted as CT number), where, e.g., bone (and/or hard tissue) is in the range [500-1900], and/or soft tissue in the range of [100-300].

The scalar values from the medical scanner may be mapped to optical properties, such as color and/or opacity, by one or more classification functions.

The image dataset (briefly also: image; also denoted as rendered image) may include a subset of the information included in the volumetric medical dataset. Alternatively, or in addition, the image dataset may include data from the volumetric medical dataset for display on a display device, in particular including a (e.g. two-dimensional) screen. Further alternatively, or in addition, the image dataset may include a projection onto an image plane in relation to the volumetric medical dataset.

A display device may include a screen, e.g., a liquid-crystal display (LCD), and/or a cathode-ray tube (CRT). Alternatively, or in addition, the display device may include a head-mounted display (HMD) and/or a head-up display (HUD). The HMD may include an augmented reality (AR) headset, a virtual reality (VR) headset, and/or an extended reality (XR) headset. Alternatively, or in addition, AR and VR may collectively be denoted as XR.

The display device, e.g., the AR (and/or XR) headset, may include a pass-through device. Alternatively, or in addition, a screen of the display device may be non-transparent (and/or opaque). E.g., a pass-through AR headset may be non-transparent (and/or opaque).

Alternatively, or in addition, the display device, e.g., the AR (and/or XR) headset, may include a see-through device. E.g., a screen of the display device may be (e.g., at least partially) transparent.

The exposure value may include, or may correspond to, a (e.g., overall) brightness (also: luminance) of the image dataset.

The determining of the exposure value for each rendering type based on a consistency requirement for changing the rendering type of the output (e.g., of the image dataset) may include assigning a fixed offset (and/or a uniform offset for all voxels, and/or all pixels) of the exposure value. The fixed offset may be defined relative to a default exposure value for a rendering type. E.g., the default exposure value may be set independently of the other rendering types within the rendering set. Alternatively, or in addition, the fixed offset per rendering type may be determined manually, e.g., in advance. The act of determining the exposure value may include modifying the offset, e.g., shifting away from the manually predetermined fixed offset per rendering type.

The user input may trigger a change in the rendering type. Alternatively, or in addition, consistent (and/or smooth, and/or coherent) interactive rendering of the volumetric medical dataset may include a smooth (and/or coherent) transition between the first rendering type and the second rendering type.

E.g., the user input may include a change in a preset, for example a change in the camera view. To achieve a smooth (and/or coherent) transition, the rendering algorithm may be changed. E.g., a raycasting algorithm may be applied to the volumetric medical dataset during a user interaction, such as a camera rotation. Alternatively, or in addition, raycasting may be applied to a moving image, e.g., including a rotation of the image dataset.

Outputting the image dataset (briefly also: image) may also be denoted as rendering the image dataset, and/or as providing the image dataset to the display device for rendering (and/or for displaying).

The method for dynamically adapting an exposure value for consistent interactive rendering of a volumetric medical dataset may include receiving a volumetric medical dataset, providing a rendering set including a plurality of rendering types with each rendering type adapted for providing an image dataset derived from the volumetric medical dataset, and outputting an image dataset according to a first rendering type using a first exposure value. An exposure value for each rendering type within the rendering set may be determined based on the first exposure value of the first rendering type and on a consistency requirement for changing rendering types of the image dataset output. Upon receiving a user input for modifying the output of the image dataset, a second rendering type with a second exposure value is selected and output.

The acts of determining an exposure value for each rendering type based on the currently used (e.g., the second) exposure value of the corresponding (e.g., second) rendering type and based on a consistency requirement for changing rendering types (e.g., to a third rendering type) of the image dataset output, receiving a (e.g., further) user input and selecting and outputting the image dataset according another (e.g., the third) rendering type with the corresponding determined exposure value may be repeated (e.g., according to a number of successive user inputs).

By the method, a temporal consistency (and/or a transition smoothness, e.g., when changing rendering algorithms and/or rendering presets, and/or coherency) of the rendering of the volumetric medical dataset on a display device may be improved. Thereby, a spatial understanding of anatomical structures, and/or of regions of interest (ROI), within the volumetric medical dataset may be improved. Alternatively, or in addition, a diagnosis and/or treatment planning may be improved. Further alternatively, or in addition, an analysis of a history of a clinical condition (also denoted as health condition), and/or a prognosis thereof, may be improved.

The volumetric medical dataset, and/or at least a subset of the rendering set may include a high dynamic range (HDR). Alternatively, or in addition, a display device may have a limited dynamic range, and/or a low dynamic range (LDR). Further alternatively, or in addition, the output (and/or rendered) image dataset may be, or may have, high dynamic range, e.g., from using physically-based illumination, while a display may be, or may have, low dynamic range.

The data (e.g., the image dataset) itself having a high dynamic range may be solved (and/or taken into account) through the voxel classification and windowing.

Tone mapping may include mapping one set of colors (and/or brightnesses) to another set of colors (and/or brightnesses) to approximate the appearance of HDR in a medium that has a more limited dynamic range, e.g., a display device. Alternatively, or in addition, tone mapping may modify the pixel color and/or pixel brightness, e.g., by compressing the dynamic range.

The exposure value may be, or may include, a parameter of a renderer, e.g., embodied by the computing device (and/or photography camera in the physical equivalent), that determines how the "sensor" and/or renderer reacts to the lighting.

The inventive interactive rendering of the volumetric medical dataset, which makes use of exposure compensation across different rendering types, may be combined with progressive rendering, e.g., including Monte Carlo path tracing, where more and more light paths are simulated over time to refine the (e.g., displayed) image dataset (also denoted as rendered image) Alternatively, or in addition, the progressive rendering may include a noise reduction over time. Further alternatively, or in addition, the continuous determining of the exposure value for each rendering type (also denoted as the continuous exposure compensation) may be used with progressive rendering to keep the exposure consistent as the (e.g., displayed) image dataset refines.

The technique may target exposure compensation tone mapping operators, where the exposure (e.g., compensation) value is determined based on an anatomy context.

A rendering type may include a rendering algorithm. Alternatively, or in addition, a rendering type may include a classification of anatomical structures included in the volumetric medical dataset. Further alternatively, or in addition, a rendering type may include a rendering preset (also denoted as rendering parameter, or briefly: preset). The rendering preset may in particular include a camera view (also denoted as camera parameter, and/or viewing parameter), a light source profile, a clipping plane, and/or a rendering window.

The classification may include a classification per voxel and/or per pixel. Alternatively, or in addition, the classification may include a material, a tissue type, and/or an organ. Further alternatively, or in addition, the classification may include a classification of anatomical structures (also denoted as anatomy classification).

The light source profile may also be denoted as lighting design, lighting parameter, lighting preset, lighting definition and/or shape of a (e.g., virtual) light source. The light source profile may include a point-like light source, a planar light source, a curved light source, and/or a diffuse light source. Alternatively, or in addition, the light source profile may include a color, and/or an intensity of the light emitted from the (e.g., virtual) light source.

The rendering algorithm may include raycasting. Alternatively, or in addition, the rendering algorithms may include path tracing, in particular Monte-Carlo path tracing. Alternatively, or in addition, the rendering algorithms may include interactive volume lighting (IVL). Further alternatively, or in addition, the rendering algorithms may include half-angle slicing.

Differentiable rendering (DR) may refer to a property of a rendering algorithm. E.g., a raycaster may be implemented in such a way that image-space derivatives with respect to predetermined rendering parameters are computed. Differentiable Monte Carlo path tracing implementations exist as well.

The rendering process (and/or the renderer), e.g., including determining exposure values for all rendering types as well as selecting and using a rendering type for outputting the image dataset, may be differentiable. Alternatively, or in addition, DR may model the explicit relationship between rendering parameters and resulting images in traditional image synthesis. In DR, image-space derivatives with respect to the rendering parameters may be obtained, which can be used in a variety of gradient-based optimization methods, e.g., to solve inverse rendering problems, or to compute the loss for training machine learning models directly in the space of rendered images.

In the context of the technique, the volume rendering may determine (e.g., compute) image-space derivatives with respect to the exposure value (also denoted as exposure rendering parameter), which may be used for more accurate (e.g., than conventional) adaptation of the exposure. Derivatives with respect to other parameters (and/or presets) may be used for more accurate exposure compensation, e.g., during camera movement.

The raycasting may include volume raycasting with local illumination. Alternatively, or in addition, the raycasting may include approximate global illumination and/or denoised low-resolution path tracing.

For every pixel on the output image, a primary ray may be shot to the scene. The ray may start at the image pixel, and the direction of the ray may be defined by the image projection direction. Alternatively, or in addition, for every sampling point on the primary ray, the volume and/or a signed distance field (SDF; also denoted as signed distance function) may be sampled.

The signed distance field (SDF) may also be denoted as signed distance function, or shortly as distance field. Alternatively, or in addition, the SDF includes a position as an input and outputs a distance from the position to a nearest part of a shape (e.g., segmented organ, vessel, medical instrument, body, and/or part thereof). Further alternatively, or in addition, the SDF may include a subtraction of an inverted Euclidean distance transform (EDT) from an original EDT. Still further alternatively, or in addition, a negative value of the output of the SDF may correspond to a position inside a contour of the shape and a positive value of the output of the SDF may correspond to a position outside the contour of the shape, or vice versa.

Monte-Carlo path tracing may produce (and/or create) global illumination effects. Alternatively, or in addition, Monte-Carlo path tracing may take into account the physics of (e.g., real) light, in particular accurately, which may result in global illumination.

(E.g., physically-based) Monte Carlo path tracing and/or ray tracing (also briefly path tracing and/or ray tracing) may be used to simulate light path though volumetric medical data (briefly: volume data) with multiple scattering events per path using a stochastic process. As more and more paths and/or rays are simulated, the solution converges on an accurate estimation of the irradiance at each point for incoming light from all directions. A renderer may employ a hybrid of volumetric scattering and surface-like scattering, modeled by phase functions and bidirectional reflectance distribution functions (BRDFs), respectively, based on properties derived from anatomical data, in particular the anatomical structures of the overlay image and/or the corresponding background structure.

Bounding volume hierarchy (BVH) may include a tree-structure on a set of geometric objects (e.g., including circles, ellipses, triangles, rectangles and/or any further polygon), e.g., all of them wrapped in bounding volumes that form the leaf nodes of the tree. The nodes may be grouped as small sets and enclosed within larger bounding volumes, which in turn may be grouped and enclosed within other larger bounding volumes in a recursive fashion. By the BVH, ray tracing and/or collision detection may be efficiently performed.

The BVH may be, and/or may act as, (e.g., primarily) a spatial acceleration structure for raytracing of geometric shapes. The BVH may be useful, e.g., for the computation of SDFs from organ segmentation surfaces, and/or for rendering segmentation surfaces together with the volume data.

Half-angle slicing may include only considering light propagating within half of an opening angle relative to a camera view, and/or relative to a screen space normal. Alternatively, or in addition, a principal component analysis of the screen space normal may be performed.

Any rendering algorithm may combine screen space and volume space techniques. Alternatively, or in addition, any rendering algorithm, or any rendering type, may perform a real-time volumetric medical dataset (and/or image dataset) analysis.

In particular, raycasting with local and/or approximate global illumination may be used for interactive rendering.

Examples of approximate global illumination include raycasting with screen-space and/or volumetric ambient occlusion. Further examples of approximate global illumination may include raycasting with interactive volume light (IVL).

The volumetric medical dataset may be received from a medical scanner (briefly also: scanner). The medical scanner may also be denoted as medical imaging device.

The medical scanner may be selected from the group consisting of a magnetic resonance imaging (MRI) device, a computed tomography (CT) device, an ultrasound (US) device, a radiography device, an echocardiograph, a positron emission tomography (PET) device, and/or a single-photon emission computed tomography (SPECT) device.

The outputting of the image dataset according to the selected second rending type with the determined second exposure value may be applied to the next rendered frame, or a predetermined number of later rendered frame, after the user input was received. The change from one rendering type (e.g., the first rendering type) to another rendering type (e.g., the second rendering type) may be performed as early as possible, and/or without any unnecessary delay.

The rendering algorithms may be switched based on changes to the rendering input, e.g., due to one or more user interactions with a camera, and/or due to streaming of ultrasound images. When the interaction, and/or data changes, are suspended, the renderer may switch to a progressive rendering algorithm to refine the (e.g., displayed) image dataset (also: rendered image) until the next user interaction, and/or data update. Alternatively, or in addition, the switching between algorithms may be applied to just user interactions when the volumetric medical dataset (briefly: volume data) is static.

A time-like component may originate from, or may include, when there is a transition between two rendering algorithms. The time-like component may be across at least two separate frames (e.g., usually more than two frames for smoother transition). The transition between rendering algorithms may in some embodiments happen without any other time-dependent variable.

Alternatively, or in addition, any of the rendering parameters (e.g., as a component) may be time-dependent. E.g., the voxel data may be changing for 4D ultrasound, and/or when displaying time series of 3D volumes. Alternatively, or in addition, the camera, lighting, clipping, and/or any further feature, may be animated. Any one of the rendering parameters, and/or time-like components, may require dynamic adaptation of the exposure.

The determined exposure value may be based on an image metric (also denoted as perceptual metric), and in particular on optimizing the image metric.

The consistency of the medical image on the display device may be quantified in terms of the image metric. Alternatively, or in addition, optimizing (e.g., minimizing) the image metric (e.g., the perceptual, in particular difference, metric) may correspond to maximizing the consistency of the medical image upon changing the rendering type for the output.

The image metric may include an average image luminance. The luminance (also: image luminance) may also be denoted as (e.g., image) brightness. Alternatively, or in addition, the image metric may include a logarithmic image exposure value. Further alternatively, or in addition, the image metric may include a local luminance. Still further alternatively, or in addition, the image metric may include a perceptual metric. Determining the exposure value for each rendering type based on the average image luminance may include approximating the same value of the average image luminance for the volumetric medical dataset using each rendering type.

Determining the exposure value for each rendering type based on the logarithmic image exposure value may include approximating the same value of the logarithmic image exposure value for the volumetric medical dataset using each rendering type.

Determining the exposure value for each rendering type based on the local luminance may include minimizing a difference in the local luminance of the image dataset obtained from the volumetric medical dataset using different rendering types.

The perceptual metric (also denoted as perceptual difference metric) may be indicative of (and/or may quantify) a difference and/or dissimilarity between the output image datasets using different rendering types for the volumetric medical dataset. E.g., a large value of the perceptual metric may indicate a large difference and/or a large dissimilarity between the output image datasets using different rendering types.

Alternatively, or in addition, the exposure value may be optimized based on optimizing an objective function.

The objective function may include a loss function, and/or a cost function (also: error function). Alternatively, or in addition, the objective function may include a reward function. Optimizing the objective function may include minimizing the objective function (e.g., the loss function, cost function, and/or error function). Alternatively, or in addition, optimizing the objective function may include maximizing the objective function (e.g., the reward function).

Further alternatively, or in addition, the determining of the exposure value may be based on a gradient descent, e.g., regarding the image metric, and/or the objective function.

The determined exposure value for a frame may be based on multiple previous frames. A frame may be (and/or may denote) a time instance of the volumetric medical dataset. The volumetric medical dataset may include a time-like dimension.

The determination of the exposure value may be based on one or more image metrics of the previous rendered frames, e.g., and not on the medical data (and/or the volumetric medical dataset) itself. The previous rendered frames may use different medical images (and/or different image datasets, in particular originating from different volumetric medical datasets), e.g., when using time series of medical images (and/or of image datasets).

The exposure value may be adapted over time. E.g., a target exposure value may be determined, and a relaxation toward the target exposure value may be applied over a predetermined amount of time, and/or a predetermined number of rendered frames. Alternatively, or in addition, adapting the exposure value may be independent of progressive rendering, and/or of streaming data.

In the act of outputting the image dataset according to the second rendering type, a smoothing transition operation from the first rendering type to the second rendering type may be applied.

By the smoothing transition operation, the consistency of the output image dataset is further improved.

The smoothing transition operation may include an easing function. Alternatively, or in addition, the smoothing transition operation may include a gamma correction. Alternatively, or in addition, the smoothing transition operation may include a tone mapping operator. Further alternatively, or in addition, the smoothing transition operation may include a custom response curve. Still further alternatively, or in addition, the smoothing transition operation may include a relaxation parameter.

The easing function may be used to modify the relaxation toward the target exposure value with desirable properties (e.g., slower adaptation at the beginning and the end of the relaxation).

The gamma correction may include a non-linear operation for transforming the exposure value, and/or a luminance, from the first rendering type to the second rendering type and/or any further rendering type, in particular according to a power gamma.

The tone mapping operator may include mapping colors of the image dataset according to the first rendering type to colors of the image dataset according to the second rendering type.

The custom response curve may include a predetermined continuous transition, e.g., of the exposure value (and/or luminance, and/or color) of the image dataset from the first rendering type to the second rendering type. The custom response curve may be specific to the two rendering types.

The relaxation parameter may encode a time for transitioning from the image dataset output according to the first rendering type to the image dataset output according to the second rendering type.

The user input may be received by a human machine interface (HMI). Alternatively, or in addition, the user input may be received by a user interface (UI), in particular a graphic user interface (GUI). Alternatively, or in addition, the user input may be received by a (e.g., computer) mouse. Further alternatively, or in addition, the user input may be received by a keyboard. Still further alternatively, or in addition, the user input may be received by an eye tracking device tracking the view of the user.

The display device may include a see-through device. Determining the exposure value for each rendering type may include adjusting the exposure value according to a real-world background.

Alternatively, or in addition, the display device may include a pass-through device. The exposure adjustment may optionally be applied to the real-world background, the volume rendering, or both.

Determining the exposure value for each rendering may include assigning weights to voxels, pixels, zones of the volumetric medical dataset, render viewports, and/or to the image dataset. Alternatively, or in addition, determining the exposure value for each rendering type may be based on the weights of the voxels, pixels, zones, render viewports, and/or the image dataset.

The rendering viewport may refer to the typically rectangular area of the image (also: image dataset) being rendered and then analysed for exposure determinations (e.g., calculations).

Zones within the viewport may be assigned different weights, e.g., the zone including the projection of a predetermined organ may be weighted differently (e.g., from the background, and/or from zones including organs different from the predetermined organ). Alternatively, or in addition, the center zone of the viewport may be given more weight than the periphery. The assignment of different weights may be related to one or more screen-space estimation algorithms.

The ray-space or 3D space estimations do not, or need not, use properties of the rendered image (also: image dataset) and/or of the rendering viewport.

The weights of the voxels, pixels, zones, and/or render viewports (and/or zones in the rendering viewport) may be high in the center of the volumetric medical dataset, and/or at the center of the render viewport. Alternatively, or in addition, the weights of the voxels, pixels, zones, and/or render viewports may be high for one or more ROIs. Further alternatively, or in addition, the volumetric medical dataset may be assigned an importance map, e.g., with an importance value assigned to each voxel, pixel, and/or zone. A high importance value may correspond to a high weight. Alternatively, or in addition, a low importance value, e.g., at the boundaries of the image dataset (and/or the volumetric medical dataset), may correspond to a low weight. Alternatively, or in addition, parts of the volumetric medical dataset (and/or image dataset, and/or medical image) cannot, or may not, be excluded as less important by default. Further alternatively, or in addition, the periphery of the rendered image and/or the output image dataset (e.g., in screen-space), and/or structures away from specific regions of interest (e.g., in voxel-space) may correspond to a low weight.

There may be algorithms that render into multiple viewports (e.g., raycast for the full viewport, and/or path tracing for a smaller viewport in the center of the image). A high weight, and/or a high importance value, may also be denoted as high priority. Alternatively, or in addition, a low weight, and/or a low importance value, may be denoted as low priority.

Further alternatively, or in addition, a (e.g., normalized) distance between a voxel (and/or pixel) and a scree-space projection may be mapped to a priority of the voxel (and/or pixel). Still further alternatively, or in addition, a (e.g., normalized) distance between a ray integral sampling position and a (e.g., three-dimensional, 3D) segmentation may be mapped to a priority. E.g., a large distance may correspond to a low priority, and a small distance may correspond to a high priority.

Alternatively, or in addition, assigning weights to voxels, pixels, and/or zones may include identifying occluded structures as ROIs to be displayed.

The assignment of weights to voxels, pixels, zones, and/or render viewports may further include projecting a virtual surgical device onto the image dataset. The virtual surgical device may be assigned a high weight and/or a high priority. Alternatively, or in addition, the virtual surgical device may occlude (e.g., deeper according to a depth estimation, and/or relative to a camera position) anatomical structures.

Further alternatively, or in addition, a depth estimation may be compared to a (e.g., 3D) segmentation. Alternatively, or in addition, a depth image (and/or a priority, and/or an importance within an importance map) may be based on a camera-space distance to an anatomical structure.

The determined exposure values for each rendering type may be stored in a temporary buffer. The outputting of the image dataset according to the selected second rendering type may include accessing the temporary buffer for retrieving the determined second exposure value.

The temporary buffer may also denoted as temporary memory, fast memory, temporary storage, cache, and/or briefly also as buffer.

A machine learning (ML) algorithm across at least part of the plurality of rendering types, in particular across the rendering algorithms, may be employed for the determining of the exposure values of the rendering types within the rendering set.

The (e.g., determined) exposure value from one (e.g., the first) rendering type may act as input to the ML algorithm for another (e.g., the second) rendering type.

According to an embodiment, the volumetric medical dataset may include two or more volumetric medical datasets (e.g., from different medical scanners and/or different scanning modalities), in particular time series, e.g., in 4D ultrasound, 4D CT, and/or longitudinal studies. As the data (e.g., the volumetric medical dataset) changes over time during rendering, the dynamic exposure value adaptation (also denoted as exposure estimation) may be applied in order to account for the data changes.

Particularly, the ML approach may be used to determine (e.g., estimate) an initial exposure value based on the determined (e.g., computed) exposure value from a different rendering type, and/or a different scanning modality. E.g., a ML model may be trained to determine (e.g., estimate) the correct exposure value when data changes from one MRI sequence to another for the same patient.

The technique may be further applied to changing volumetric medical datasets. E.g., in the act of receiving a volumetric medical dataset, two or more volumetric medical datasets may be received. The act of providing the rendering set may include providing at least one rendering type per volumetric medical dataset. The act of determining an exposure value for each rendering type may include determining at least one exposure value for each volumetric medical dataset. Based on a received user input, a change in volumetric medical datasets for the output may be selected and performed.

Alternatively, or in addition, the technique may be applied to any changing volumetric medical datasets, analogously to applying the technique to changing presets.

The volumetric medical datasets may be received from the same or different medical scanners, and/or from the same or different medical imaging modalities and/or sources (e.g., repositories). Alternatively, or in addition, the volumetric medical datasets may be received in association with, and/or come from, the same patient, e.g., during a surgical procedure, and/or from different patients.

As to a device aspect, a computing device (computer or processor) for dynamically adapting an exposure value for consistent interactive rendering of a volumetric medical dataset is provided. The computing device includes a first receiving unit (receiver or input interface), which is configured for receiving a volumetric medical dataset. The computing device further includes a rendering set providing unit (computer or processor), which is configured for providing a rendering set including a plurality of rendering types. Each rendering type within the rendering set is adapted for providing an image dataset derived from the received volumetric medical dataset. The plurality of rendering types includes at least two different rendering types.

The computing device further includes an outputting unit (output interface, renderer, or graphics processing unit), which is configured for outputting, to a display device, an image dataset pertaining to the received volumetric medical dataset according to a first rendering type within the rendering set. The outputting includes applying a first exposure value to the image dataset. The computing device further includes an exposure value determining unit, which is configured for determining an exposure value for each (e.g., respective, and/or associated) rendering type within the rendering set. The exposure value is adapted for displaying the image dataset according to the e.g., respective, and/or associated) rendering type on a display device. The exposure value for each rendering type is determined based on the first exposure value according to the first rendering type. The determining of the exposure value for each rendering type is based on a consistency requirement for changing rendering types of the image dataset output. The computing device further includes a second receiving unit (input device, receiver, or input interface), which is configured for receiving a user input (also denoted as: user interaction) for modifying the output of the image dataset. The computing device still further includes a selecting unit (computer or processor), which is configured for selecting, based on the received user input, a second rendering type with a determined second exposure value for outputting the image dataset pertaining to the received volumetric medical dataset. The second rendering type differs from the first rendering type. The outputting unit of the computing device is further configured for outputting, to the display device, the image dataset according to the selected second rendering type with the determined second exposure value.

The computing device may be configured to perform any acts, or include any features of, the method according to the method aspect.

As to a system aspect, a system for dynamically adapting an exposure value for consistent interactive rendering of a volumetric medical dataset is provided. The system includes a computing device according the device aspect as well as a display device, which is configured for receiving an image dataset from the outputting unit of the computing device. The system further includes a user interface, which is configured for forwarding a received user input to the second receiving unit of the computing device. Optionally, the system further includes at least one medical scanner, which is configured for providing a volumetric medical dataset to the first receiving unit of the computing device.

As to a further aspect, a computer program product is provided. The computer program product includes program elements which induce a server (e.g., embodied by the computing device according to the device aspect) to carry out the acts of the method for dynamically adapting an exposure value for consistent interactive rendering of a volumetric medical dataset according to the method aspect, when the program elements are loaded into a memory of the server (e.g., the computing device).

As to a still further aspect, a non-transitory computer-readable medium is provided. On the computer-readable medium, program elements are stored that can be read and executed by a server, processor, and/or computer (e.g., embodied by the computing device according to the device aspect), in order to perform acts of the method for dynamically adapting an exposure value for consistent interactive rendering of a volumetric medical dataset according to the method aspect, when the program elements are executed by the server (e.g., the computing device).

The properties, features and advantages of this invention described above, as well as the manner they are achieved, become clearer and more understandable in the light of the following description and embodiments, which will be described in more detail in the context of the drawings. This following description does not limit the invention on the contained embodiments. Same components or parts can be labelled with the same reference signs in different figures. In general, the figures are not for scale.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

FIG. 1 is a flow chart of a method according to a preferred embodiment;

FIG. 2 is an overview of the structure and architecture of a computing device according to a preferred embodiment;

FIGS. 3A, 3B and 3C show examples using different rendering algorithms, in particular, in FIG. 3A volume raycasting with local illumination only, in FIG. 3B raycasting with approximate global illumination, and in FIG. 3C volumetric Monte Carlo path tracing as known in the art;

FIGS. 4A and 4B show examples of different rendering presets applied to the same dataset without exposure offset and with exposure offset, respectively;

FIGS. 5A and 5B show examples of global auto-exposure with center zone metering.

Figure 6A:
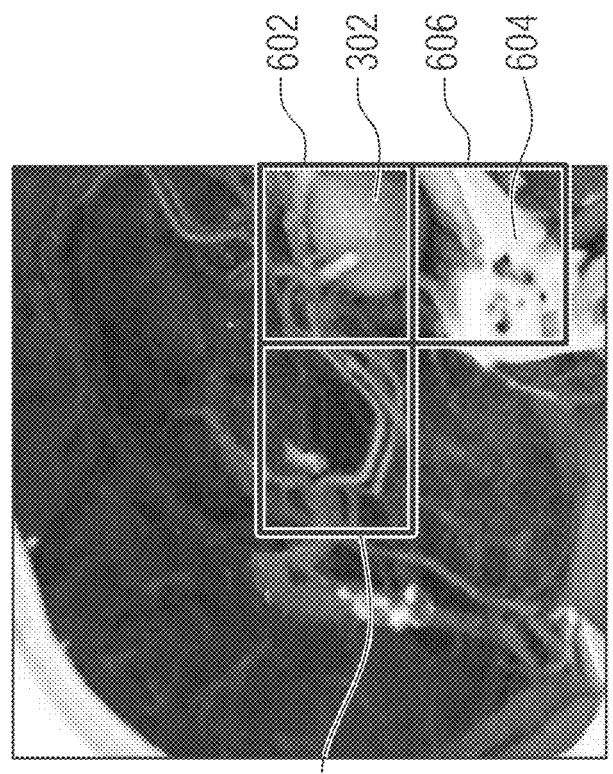
FIGS. 6A and 6B show examples of global auto-exposure with center zone metering and an anatomical structure, e.g., aneurysm, mask weighting, respectively.

Any reference signs in the claims should not be construed as limiting the scope.

DETAILED DESCRIPTION OF THE DRAWINGS

FIG. 1 shows an exemplary embodiment of a computer-implemented method for dynamically adapting an exposure value for consistent interactive rendering of a volumetric medical dataset. The method is generally referred to by reference sign 100.

In an act S102, a volumetric medical dataset is received. In an act S104, a rendering set including a plurality of rendering types is provided. Each rendering type within the rendering set is adapted for providing an image dataset derived from the received S102 volumetric medical dataset.

The plurality of rendering types includes at least two different rendering types (e.g., at least two different rendering algorithms, classifications of anatomical structures included in the volumetric medical dataset, and/or rendering presets).

In an act S106, an image dataset is output to a display device. The image dataset pertains to the received S102 volumetric medical dataset according to a first rendering type within the rendering set. The outputting act S106 includes applying a first exposure value to the image dataset.

In an act S108, an exposure value for each rendering type within the rendering set is determined (e.g., for N rendering types with N a natural number, N exposure values are determined, in particular one separate exposure value per rendering type). The exposure value is adapted for displaying the image dataset according to the rendering type on a display device. The exposure value for each rendering type is determined based on the first exposure value according to the first rendering type. The determining in act S108 of the exposure value for each rendering type is based on a consistency (and/or transition smoothness, and/or coherency) requirement for changing rendering types of the image dataset output S106.

In an act S110, a user input for modifying the output S106 of the image dataset is received. Receiving the user input may alternatively be denoted as user interaction.

In an act S112, based on the received S110 user input, a second rendering type with a determined S108 second exposure value is selected for outputting in act S114 the image dataset pertaining to the received S102 volumetric medical dataset. The second rendering type differs from the first rendering type. In an act S114, the image dataset is output to the display device according to the selected second rendering type with the determined second exposure value.

Any one of the acts may be repeated. E.g., based on the second exposure value associated with the second rendering type, the exposure value for any other rendering type within the rendering set may be determined in act S108, and after receiving in act S110 a further user input, a third rendering type (which may be, but need not be, identical to the first rendering type) may be selected in act S112 for further outputting in act S114.

Applying the acts S108 to S114, e.g., repeatedly, may also be denoted as (e.g., performing) adaptive auto-exposure (or briefly: auto-exposure).

FIG. 2 shows an exemplary embodiment of a computing device for dynamically adapting an exposure value for consistent interactive rendering of a volumetric medical dataset. The computing device is generally referred to by reference sign 200.

The computing device 200 includes a first receiving unit (receiver or input interface) 202, which is configured for receiving a volumetric medical dataset.

The computing device 200 further includes a rendering set providing unit 204, which is configured for providing a rendering set including a plurality of rendering types. Each rendering type within the rendering set is adapted for providing an image dataset derived from the received volumetric medical dataset. The plurality of rendering types includes at least two different rendering types.

The computing device 200 further includes an outputting unit (output interface, renderer, and/or graphics processing unit) 206, which is configured for outputting, to a display device, an image dataset pertaining to the received volumetric medical dataset according to a first rendering type within the rendering set. The outputting includes applying a first exposure value to the image dataset.

The computing device 200 further includes an exposure value determining unit 208, which is configured for determining an exposure value for each rendering type within the rendering set. The exposure value is adapted for displaying the image dataset according to the rendering type on a display device. The exposure value for each rendering type is determined based on the first exposure value according to the first rendering type. The determining of the exposure value for each rendering type is based on a consistency requirement for changing rendering types of the image dataset output.

The computing device 200 further includes a second receiving unit 210, which is configured for receiving a user input for modifying the output of the image dataset.

The computing device 200 still further includes a selecting unit 212, which is configured for selecting, based on the received user input, a second rendering type with a determined second exposure value for outputting the image dataset pertaining to the received volumetric medical dataset. The second rendering type differs from the first rendering type.

The outputting unit 206 is further configured for outputting, to the display device, the image dataset according to the selected second rendering type with the determined second exposure value.

The first receiving unit 202 and the second receiving unit 210 may be combined into an input unit 216 (also denoted as collective receiving unit 216).

Alternatively, or in addition, the first receiving unit 202, the second receiving unit 210 and the outputting unit 206 may be combined into an input-output unit 218.

The rendering set providing unit 204, the exposure value determining unit 208, and the selecting unit 212 (and/or any pairwise combination thereof) may be combined on a processor 220.

The computing device 200 may further include memory 222. The memory 222 may include a storage for a computer program for performing the method, and/or a temporary buffer for storing the determined exposure values for each rendering type.

The computing device 200 may be configured to perform the method 100.

The computing device 200 may be included in a system for dynamically adapting an exposure value for consistent interactive rendering of a volumetric medical dataset. The system may further include a display device, which is configured for receiving an image dataset from the outputting unit 206 of the computing device 200. The system may still further include a user interface, which is configured for forwarding a received user input to the second receiving unit 210 of the computing device 200. Alternatively, or in addition, the second receiving unit 210 may include a user interface.

Optionally, the system may further include at least one medical scanner, which is configured for providing (e.g., in real-time) a volumetric medical dataset to the first receiving unit 202 of the computing device 200.

The technique (e.g., including the method 100 and/or computing device 200) addresses the inconsistent brightness and contrast in conventional medical visualization based on photorealistic high dynamic range rendering. In contrast to conventional volume rendering with local illumination, algorithms that account for global illumination effects such as light occlusion and multiple scattering create complex lighting effects that may result in suboptimal illumination of important anatomical structures. The technique implements an auto-exposure component inspired by real-world imaging devices and modern techniques in interactive computer graphics to compute and adapt the exposure of the scene. The technique further leverages artificial intelligence (AI)-based techniques such as automated 3D medical image segmentation to support clinical medical workflows.

A preferred embodiment of the technique includes an interactive volume renderer (e.g., embodied by the computing device 200) for medical volumetric (and/or three-dimensional, 3D) data, which implements Monte Carlo path tracing as progressive final renderer and various approximate techniques during interactive rendering (e.g., when one or more user inputs are received). The interactive rendering modes may include volume raycasting with local illumination, raycasting with approximate global illumination, and/or denoised low resolution path tracing.

The preferred embodiment, or any further embodiment, may further include rendering presets for voxel classification, material definition, lighting design, and/or various data clipping tools.

The following broad categories of techniques for determining the exposure value (also denoted as: computing the scene exposure) may be applied, e.g., together, in real-time (alternatively also denoted as: at runtime) in response to user inputs (also: user interactions): hybrid rendering and dynamics, consistency across datasets and presets, and/or anatomy intelligence.

Hybrid rendering and dynamics may include determining exposure values (also denoted as: exposure calculations) that handle transitions between interactive and/or progressive final rendering modes.

Interactive rendering may be applied during user interaction (and/or user input) with the computing device 200 and/or system (e.g., including the computing device 200 for performing the method 100), and/or while rendering parameters are changing (e.g., animated parameters, and/or data series playback). Interactive rendering typically uses the fast and/or approximate rendering.

Final rendering is optionally applied when rendering parameters are not changing, and/or the computing device 200 and/or system (e.g., including the computing device 200 for performing the method 100) has time and resources to run a higher quality algorithm.

In some cases, final rendering may not be possible. E.g., in AR and/or VR applications, the head position of the user is tracked continuously (e.g., corresponding to continuous user input), and the images (also: image datasets) are rendered continuously.

The final rendering may use a progressive rendering algorithm. E.g., with Monte Carlo path tracing, light paths are continually generated and traced through the volume, so the quality of the final image improves over time as more paths are determined (e.g. computed), in particular the estimation (and/or determination) error decreases. The computing device 200 and/or system (e.g., including the computing device 200 for performing the method 100) may wait until an image (also: image dataset) of a predetermined quality is achieved before displaying it, and/or it may display the intermediate results continuously so that the user can see the image (and/or image dataset) getting progressively better.

Consistency across datasets and/or across presets may include determining exposure values (also denoted as: exposure calculations) that account for rendering preset changes, such as—but not limited to—voxel classification, and/or lighting design (also denoted as light source profile).

Anatomy Intelligence may include determining exposure values (also denoted as: exposure calculations) that account for detected anatomical structures in the scene, preferably including both screen-space (and/or two-dimensional, 2D) and volume-space (and/or three-dimensional, 3D) techniques.

The technique is described herein with reference to embodiments used in clinical workflows, e.g., for diagnostic support, treatment planning, surgical planning, and/or evaluation of clinical (e.g., therapeutical) history.

The technique does not require any modification to the lighting environment, which may use high dynamic range (HDR) image-based lighting, e.g., in addition to synthetic light sources. Alternatively, or in addition, the technique can leverage an anatomical context to dynamically select and adapt the exposure value (also denoted as exposure parameter), e.g., for a simple tone mapping operator. Further alternatively, or in addition, the technique can employ both screen-space and ray-space analysis (e.g., combinedly, and/or individually) during volume rendering to handle the volumetric properties of the medical dataset (briefly also: data).

The technique can primarily implement dedicated auto-exposure using real-time image analysis, and/or heuristics, based on the output of conventional rendering techniques. Alternatively, or in addition, aspects of the technique related to machine intelligence (also denoted as machine learning, ML, and/or artificial intelligence, AI). Further alternatively, or in addition, scene understanding can be applied to auto-exposure based on differentiable volume rendering.

An exemplary embodiment of the technique implements a hybrid rendering approach, where various rendering algorithms are combined as part of the workflow. Given that the global illumination algorithms account for light occlusion, and therefore produce images with significantly higher dynamic range (e.g., as compared to only local illumination algorithms), the technique can handle the rendering algorithm changes explicitly, in particular at runtime, to produce a consistent exposure of the three-dimensional (3D) scene.

Differences in rendering algorithms often result in images that are not equally exposed, which is conventionally not an issue as most engines use a single algorithm for rendering. For medical visualization, however, often multiple rendering algorithms are used in the same system (e.g., by the same computing device, and/or for outputting to the same display), often switching between them at runtime, and/or on the fly, e.g., based on one or more user inputs. The use of multiple rendering algorithms may alternatively be denoted as hybrid rendering.

Often, a real-time rendering algorithm, e.g., raycasting, is used during interactions (e.g., including one or more user inputs). A switch to a slower but more physically accurate algorithm, e.g., path tracing, may be performed after interaction (e.g., after not receiving any user input for a predetermined period of time). Sometimes, the conventional transitions between rendering algorithms result in jittery visualization because of differences in perceived brightness resulting from different lighting computations and/or different rendering presets, e.g., light source profiles.

In an embodiment, when the different rendering algorithms have a consistent brightness difference at the same exposure level, the technique uses two or more separate exposure offsets (e.g., stored in a rendering preset, and/or visualization preset) for each rendering algorithm. While blending the results of the algorithms, the exposure offsets are also blended to produce consistent brightness throughout the transition.

The offset may be associated with a particular preset and/or a particular rendering algorithm. E.g., the preset in FIGS. 3A, 3B and 3C may need a lower default offset for raycasting and a higher for path tracing (e.g., the light occlusion in FIG. 3C makes all images produced with that algorithm consistently darker). Alternatively, or in addition, it may not be sufficient to have a single offset when transitioning between rendering algorithms, and/or a separate offset for each preset under each algorithm may be needed.

In another embodiment, the technique makes use of post processing, which is applied during transitions between different (e.g., rendering) algorithms. Sharp changes in brightness may be detected, and the exposure value (briefly also: exposure) can be continuously adjusted to result in the same (e.g., perceived, in particular according to an image metric, and/or a perceptual metric) image brightness.

In one embodiment, post processing may include keeping track of an image histogram (e.g., in terms of highlights and shadow of the volumetric medical dataset, and/or of the image dataset obtained from the volumetric medical dataset), and the exposure value may be adjusted to keep the highlights and shadows of the image dataset from clipping.

In another embodiment, the image dataset may be downsampled multiple times, e.g., in a compute shader (e.g., which may be included in the computing device 200), until the image brightness can be represented in a few pixels (e.g., one), and the exposure value is adjusted if required. Alternatively, or in addition, the power gamma may be adjusted to maintain optimal contrast, e.g., using tone mapping shaders in a similar way.

Conventional ways may be used to determine (e.g., compute) the perceived luminance (also denoted as brightness) from the color of the pixel, e.g., depending on color spaces, and/or on display devices. Alternatively, or in addition, the luminance may be determined as, or may be, a weighted sum of the red, green and blue components.

The above may be true for a single pixel. When the average luminance over the entire image (and/or image dataset) or (e.g., all) zones within the image is determined (e.g., computed), the image may be averaged down (also denoted as downsampled) until the correct granularity is obtained. E.g., if nine (9) zones for center-weighted metering are used, downsampling is performed a 3×3 image (and/or image dataset) is obtained and the luminance of the center pixel is determined (e.g., computed). There are conventional algorithms to determine (e.g., compute) the average luminance, and/or the luminance of the center pixel, in a single pass, in particular without requiring intermediate steps (and/or intermediate representations, and/or intermediate image datasets) and/or additional memory, e.g., for the computation.

In an embodiment, the determined (e.g., computed) exposure value is applied to the next rendered frame.

In a further embodiment, a feedback mechanism is introduced to continuously adjust the (e.g., rendering) exposure value (also: exposure parameter) Exp based on an image metric. As a simple example, the average image luminance Lum, or the logarithmic (e.g., image) exposure value EV may be used to determine (e.g., compute) the (e.g., rendering) exposure value change at each frame. Alternatively, or in addition, a local luminance or a perceptual metric associated with the luminance may be used. E.g., the change in the exposure value may be proportional to the difference of a target logarithmic (e.g., image) exposure value and the current logarithmic (e.g., image) exposure value, $$\Delta \text{Exp} = \tau(\text{EV}_{target} - \text{EV}_{current}), \tau \in (0,1)].$$

where $\tau$ may denote a relaxation parameter.

In a further embodiment, multiple previous frames may be used for luminance estimation (and/or determination of the exposure value for each rendering type) with a higher-order polynomial function. The function may be composited with an easing function, gamma correction, (e.g., other) tone mapping operator, and/or one or more custom response curves. The relaxation parameter $\tau$ may be modified based on requirements of the interactive system, such as faster exposure adaptation during lighting design (and/or light source profile) changes, e.g., as opposed to increased temporal coherency during camera movement (and/or camera view changes), and/or data clipping (and/or clipping plane changes).

In an embodiment, the exposure value from one (e.g., a first) rendering algorithm may be used as an input to a machine learning (ML) pipeline along with the rendering presets (and/or rendering parameters) and image datasets for one or more other (e.g., a second) rendering algorithm. Alternatively, or in addition, a generalized model may be created to predict the corresponding exposure values between different rendering algorithms.

Alternatively, or in addition, for a differentiable volume renderer with an exposure value as a differentiable parameter, the auto-exposure problem can be formulated as an objective function, where the minimal value corresponds to an optimally exposed scene. Various optimization techniques, such as gradient descent, may then be used to compute the optimal value for the (e.g., rendering) exposure value (and/or exposure parameter).

In AR (and/or XR) embodiments, a real-world video feed may be an image source (e.g., as the volumetric medical dataset) driving the determining of the exposure value (also denoted as exposure computation). For a see-through device, the real-world video feed may be used to adjust the exposure of the volume rendering. Alternatively, or in addition, for a pass-through device, the real-world video feed may be used to adjust the exposure value of the volume rendering as well as the real-world video feed itself.

Occasionally, it is desirable to overexpose or underexpose a (e.g., displayed) image dataset overall to highlight one or more organs, and/or areas, e.g., depending on a classification of anatomical structure. In an embodiment, the rendering type includes the classification, and/or a rendering preset (also denoted as classification preset) includes an exposure offset to overexpose, and/or underexpose, the image dataset consistently across datasets, in particular pertaining to the same volumetric medical dataset, as shown in FIGS. 4A and 4B.

In FIGS. 4A and 4B, different classifications, and/or different clipping planes, are applied to a (and/or the same) volumetric dataset of a human bust (and/or head, throat and parts of the upper body). The columns are labeled by reference signs 412; 414; 416 and 418. The rows are labeled by reference signs 402; 404; 406 and 408. E.g., at the positions (402; 412); (402; 414); (402; 416); (406, 418); (408; 412); (408; 414) and (408; 416) the front (and/or facial) side of the skull has been clipped of to provide a view into the interior of the head. At position (408; 418), the surface, and/or the skin area, of the human bust is displayed. At position (408; 414), a lung preset (briefly: the lungs) as an example of an internal classified anatomical structure are displayed.

Some of the presets in FIGS. 4A and 4B may be intended for displaying specific structures (e.g., bone, lung, and/or soft tissue), and/or for use in specific medical workflows (e.g., spine surgery, and/or colonoscopy), and/or with certain imaging modalities (CT, MRI, ultrasound). The presets used in FIGS. 4A and 4B in particular include various examples of soft-tissue presets for illustrative purposes of the need for adapting the exposure value (also denoted as exposure compensation), with the position at row 408 and line 414 displaying the lung preset.

In FIG. 4A, each classified anatomical structure is shown without exposure offset. Thus, upon changing from one classification to another (and/or switching between positions, i.e., changing between columns, and/or rows), the image brightness varies significantly. E.g., the image datasets at positions (402; 412) and (406; 416) are underexposed relative to other datasets.

In FIG. 4B, each classified anatomical structure is shown with a, in particular classification-specific, exposure offset. Thereby, any selected anatomical structure is easily perceptible throughout all image datasets. Alternatively, or in addition, consistency across the image dataset, and/or across the (e.g., classification) presets, is achieved.

In an extension to the above embodiments, based on the current state and/or one or more user inputs (also: user interactions), the computing device 200 (and/or the system including the computing device 200) can determine in advance (also: pre-compute) exposure values for different clinical (e.g., classification) presets. The exposure values being determined in advance allows to apply exposure values for the user selected preset while the preset is loading, thereby reducing latency. E.g., for AR (and/or VR) scenarios, and/or for any further real-time application, it is important to maintain low latency.

Alternatively, or in addition, to presets, the exposure values can be determined in advance (and/or pre-computed) for, e.g., discrete, head tracking and/or eye tracking positions. Lower resolution images may be rendered (and/or displayed), e.g., when determining the exposure values in advance, to determine (also: compute) exposure values for multiple presets, which may be applied during rendering, and/or when outputting to a display (e.g., to an XR headset).

Brightness can change when the presets for lighting setup, camera view, clipping planes, windowing, and/or any further rendering parameter, are changed. Alternatively, or in addition, brightness can change as path tracing result when a progressive renderer converges. Further alternatively, or in addition, auto-exposure can smoothen brightness changes, e.g., in cases, which are not due to transitions between rendering algorithms.

In an embodiment, a continuous exposure value adjustment may be used to obtain a consistent brightness when changing image datasets, and/or when changing presets. Adaptation parameters (e.g., a speed of changing the exposure value) may be adjusted based on which category of parameters have changed. E.g., when a light source is introduced, a faster change may be more desirable. Alternatively, or in addition, when the classification changes, a slower transition may be better (and/or preferred).

In an embodiment, the heuristics for AI are adjusted based on the dynamic range supported by the display. HDR displays can display a wider range of brightness than LDR displays, and/or standard dynamic range (SDR) displays. E.g., an HDR display allows for retaining higher contrast between the brightest and the darkest regions than a SDR display or a LDR display. On supported displays, multiple zones of image can be analyzed independently, and different zones can be assigned different weights for auto-exposure determinations (and/or computations).

According to some embodiments, the weighting of each pixel for determining the exposure value (and/or luminance calculations) can leverage knowledge about the 3D scene, such as 3D (e.g., organ) segmentations for medical applications, and/or 3D regions of interest, ROI, for general rendering applications (e.g., for surgical planning, and/or for reviewing a clinical history). The knowledge about segmentations, and/or about ROIs, may also be denoted as anatomy intelligence.

A preferred embodiment uses automated AI-based organ, and/or disease (e.g., lesion), segmentation services that produce 3D masks from the volumetric medical dataset, e.g., in a pre-processing step. Normalized distances between pixels and screen-space projections of the segmentation masks, and/or between ray integral sampling positions and the 3D segmentation, are used as weights for the determination of the exposure values (and/or luminance computations).

In an embodiment, the exposure value is tuned to expose one or more (e.g., selected and/or predetermined) organs, and/or ROIs, of the volumetric medical dataset based on one or more segmentation masks. The tuning of the exposure value can be achieved by a multi-pass rendering process (e.g., repeating the acts S108 to S114 multiple times). The first pass may generate a texture representing pixels from masks that can be used to determine (e.g., compute) exposure values, in particular by rasterizing mesh segmentation objects and/or raycasting 3D masks using the same camera parameters as the main rendering pass. In subsequent passes, rendering is determined (e.g., computed), and exposure values (also denoted as exposure settings) are applied as described in other embodiments, e.g., except for only using the pixels from the first pass and not the whole image.

In an embodiment, the image dataset is divided into fixed zones (e.g., a center zone, also denoted as central zone, and a plurality of non-central zones), and the zones covered by anatomical segmentation masks are prioritized in auto-exposure determinations (e.g., computations). FIGS. 5A and 5B demonstrate exposure results with a fixed central zone 502 metering (also denoted as global auto-exposure with center zone 502 metering), which each over-expose the aneurysm 302. The bust of the image datasets of FIGS. 5A and 5B, e.g., corresponds to rotated versions of the bust displayed in FIGS. 3A, 3B and 3C.

FIGS. 3A, 3B and 3C as well as FIGS. 5A and 5B and FIGS. 6A and 6B can all be viewed as originating from the same volumetric medical dataset of a human bust with an aneurysm 302 located behind the right eye-socket, and/or within the skull.

In FIG. 5A, the exposure value is chosen as 2.48. In FIG. 5B the exposure value is chosen as 0.98.

Exposure (and/or the exposure vale) may refer to the photography concept of a predetermined amount (and/or fraction) of light reaching a sensor within a predefined exposure time. The exposure (and/or exposure value) of the photography concept may be equivalent to the inventive determination (and/or computation) of luminance from rendered pixels (e.g., according to the output image dataset). Alternatively, or in addition, a physically-based renderer may determine (e.g., compute) the luminance in physical units.

The system and/or the computing device 200 determines (and/or computes) the photographic "exposure compensation", which may be used as a parameter in a global exposure correction tone mapping operator (in particular one exposure correction for all pixels, mimicking a physical camera). The "exposure compensation" may be defined in EV units, where 1 EV is equivalent to doubling the exposure and/or perceived pixel luminance.

Figure 6B:
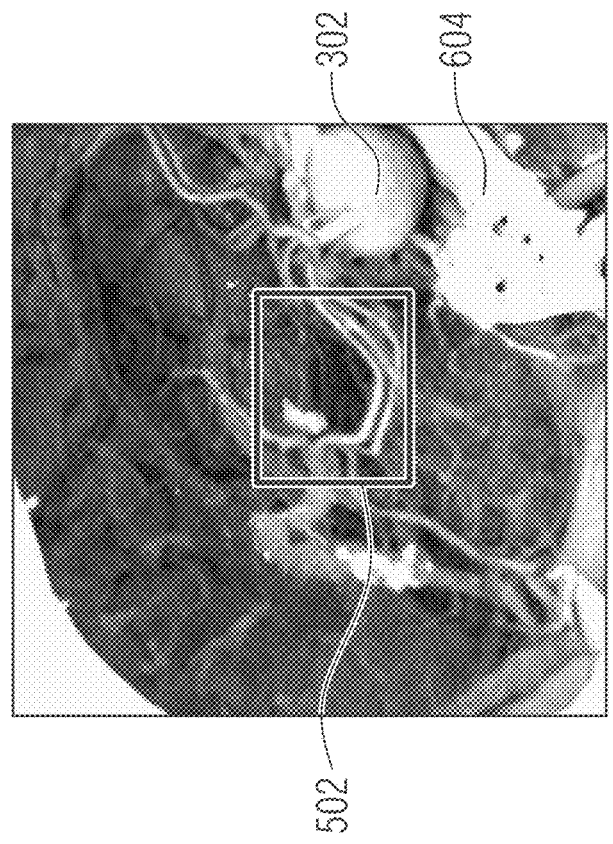

FIGS. 6A and 6B each show zoomed-in views of the interior of the human skull with an aneurysm 302 behind the right eye-socket. FIG. 6A shows global auto-exposure with center zone 502 metering. FIG. 6B shows an example of weighting by a predetermined anatomical structure, in particular aneurysm mask weighting 602. The determination (e.g., computation) of the exposure value in FIG. 6B selects the correct metering zone 602 based on the luminance of the zones covered by an aneurysm 302 mask.

The vessels in the center of the image are easier to see in FIG. 6A, in which, however, the aneurysm 302 is over exposed. Using an aneurysm 302 segmentation mask to select pixels during metering ensures that the relevant structure is exposed correctly in FIG. 6B.

In FIG. 6A, the exposure value is chosen as 5.90. In FIG. 6B, the exposure value is chosen as 3.00. As shown at reference sign 604, also the bone structure (e.g., at and/or near the right internal acoustic meatus) of the zone 606 neighboring the zone 602 of the aneurysm segmentation mask is displayed (and/or rendered) more clearly for the lower exposure value of FIG. 6B, in particular compared to the higher exposure value of FIG. 6A.

In an embodiment, pixels are assigned priorities based on position on screen. For example, pixels in one or more fixed zones may be assigned higher weights when computing a weighted average of the image luminance. E.g., FIGS. 5A, 5B and 6A can be viewed as examples, in which only the center zone 502 is assigned a non-vanishing weight.

Determining the exposure value based on (e.g., weighted) zones may be denoted as screen-space auto-exposure steering.

In an embodiment, multiple segmentation masks (briefly: masks) may be applied, and signed distance fields (SDFs) may be determined (e.g., computed) for all masks. The weight of each pixel may be based on clinical (e.g., anatomical, and/or lesion-related) priorities of individual masks, and/or based on the value of the current pixel in the corresponding SDF.

In an embodiment, the segmentation masks may be given weights based on screen position, e.g., analogous and/or similar to the pixels in previous embodiments, e.g., to de-prioritize masked regions in the periphery of the image dataset.

In an embodiment, the exposure value is tuned for regions based on a user's interest (e.g., provided by one or more user inputs). E.g., the user may be presented with a list of regions or presets, and depending on the selected organs, ROIs and/or presets, the exposure value may be adjusted. Alternatively, or in addition, a selection, and/or marking, by a user may be provided by the user's interaction with a mouse. Further alternatively, or in addition, in an AR (and/or VR, and/or XR) use case, the user's interest may be determined using gaze tracking, e.g., ensuring the organs, and/or potential ROIs, the user is looking at are correctly (and/or suitably) exposed.

In AR (and/or XR) environments, there is often a disadvantageous visual disconnection between the displayed image dataset (and/or rendered result) and the real world visible through the headset display. The conventional disadvantageous visible disconnection is due to the difference in lighting in the virtual scene and in the real world. The conventional difference in the lighting in the virtual scene and in the real world can result in significant differences in the brightness of the displayed image datasets (also denoted as rendered images) that are supposed to be visualized in the context of the real world. The technique alleviates the problem by analyzing the brightness of the real world around the dataset position in virtual scene, and by then tuning the exposure value of the image dataset (and/or of the rendering) to minimize the difference in perceived brightness.

In an embodiment, the auto-exposure algorithm considers the procedure when rendering (and/or displaying of image datasets) is used alongside real-world images or video. E.g., when a rendering overlay in AR (and/or XR) is used on top of organs during a surgical procedure, it is vital that the exposure stays consistent with the regions when the overlay is rendered to not distract the surgeon. Alternatively, or in addition, an overlay with a virtual surgical device may be rendered to guide the surgeon, e.g., demonstrating the (in particular pre-planned) movement of incision tools during laparoscopic procedures. In such AR (and/or XR) scenarios, auto-exposure can be determined (e.g., computed) as in the other embodiments, e.g., except for an organ, and/or rather for a medical device represented using a volume, SDF, and/or a mesh dataset. Alternatively, or in addition, exposure metering may consider pixels from the real-world image or video feed together with the rendered (and/or displayed image dataset) pixels when adapting the exposure value (also: exposure parameter) in the renderer (e.g., embodied by the computing device 200).

Screen-space masking and/or weighting may lead to assigning higher weights to pixels covered by the projection of the segmentation object, but where the segmented organ is (e.g., at least partially) occluded by other anatomical structures. Alternatively, or in addition, when the segmented organ is occluded by semi-transparent anatomical structures (e.g., low optical opacity assigned by the volume rendering transfer function, and/or by visual effects such as silhouette rendering), the pixel weight preferably is modulated by the organ visibility along 3D viewing rays. The modulation improves the temporal coherency of the auto-exposure during windowing, and/or editing, of the transfer function.

The following embodiments determine the weight of each pixel for determining the exposure value (also: luminance computations) based on the 3D distance of representative anatomical structures along volume rendering viewing rays to the anatomical structure (briefly also: anatomy) of interest.

The organ segmentation, and/or the ROI, in the form of a mask, and/or a mesh, may be converted into an SDF that can be easily sampled during ray integration to query the distance from the volume sampling point to the segmented object.

The computations of depth based on ray statistics may be based on Vetter et al. (U.S. Pat. No. 10,893,262 and/or Petkov et al. US Published Application No. 2021/-279942.

Rendering via raycasting and Monte-Carlo methods require slightly different approaches.

In the case of raycasting, the ray through a pixel is commonly terminated when the opacity reaches a predetermined threshold, e.g., 0.95. In the case of ray termination, the shader program performs a lookup into the SDF (or SDFs if there are several important structures). Depending on the distance to the segmentation, an importance value may be written into an output buffer corresponding to this pixel. The importance value may also be denoted as priority value, or briefly priority.

In the case of Monte-Carlo methods, the shader accumulates values from light scattering events that all contribute to the final image dataset. The accumulation allows for performing more sophisticated analysis compared to the raycasting approach that only generates a primary viewing ray.

The accumulating of rays, and/or light scattering events, may be denoted as ray statistics for auto-exposure steering. Alternatively, or in addition, the ray statistics may be determined (e.g., computed) from the distributions of the (e.g., light) scattering events.

E.g., the density of the (e.g., light) scattering events in the vicinity of a segmentation surface may indicate how much light hitting the segmented organ reaches the (e.g., virtual) camera. If the density is high, the organ may be visible in the pixels corresponding to the ray, and/or the pixel should be weighted higher for determining the exposure value (also denoted as exposure metering).

Several methods may be used to determine (and/or compute) a representative distance to the segmentation mask, either individually, or by combining a pair or all three of the following methods.

Firstly, the simplest form of analysis determines (e.g., computes) a running average of the distance to the segmentation at a scatter event.

Secondly, distance histograms may be used. In the case of using distance histograms, the distance of q scatter event from the segmentation is binned into N (with N a natural number, e.g., N=16) bins. After M rendering passes have been performed, the bin with the most hits may be subdivided into N bins again, and the hits in other bins may be discarded. The hits in the bin with the highest number of hits are then averaged to determine (e.g., compute) the distance at that pixel position, and thereby the importance of the pixel.

The third method uses a running weighted average of the distance with the weight including the opacity contribution of the sample associated with the distance. The opacity contribution weighs samples more heavily that not only are close to the segmentation but also contribute to the (e.g., final, and/or displayed) image dataset.

In the case that there are several segmentations, the minimum distance to any of them can be determined. Alternatively, or in addition, all segmentations may be combined into one for the purpose of the distance determining (and/or computation).

A generated importance map may be used to weight the contribution of pixels in the weighted average luminance (and/or exposure value). Regions that are unimportant may be too dark, too bright, and/or without much contrast if the important regions are considered. The use of the importance map avoids compromises that might result in a globally better solution (e.g., for the exposure value) at the cost of a worse local contrast in the important regions.

In another embodiment, screen-space implementations may be augmented with a single depth image, including the camera-space distance to representative anatomical structures in the volume data as computed in U.S. Pat. No. 10,893,262. For structures closer to the camera than the segmented organ, the pixel weight may be modulated based on the distance between the positions of the representative anatomical structure (briefly: anatomy) and the first hit of the segmentation object along the viewing ray. Compared to the ray-based embodiments, the screen-space implementation with a single depth image does not account for volumetric visibility, but still provides a meaningful improvement to temporal coherency compared to the screen-space masking techniques alone.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantages which are described with respect to a particular embodiment of the present invention or with respect to a particular figure are, wherever applicable, also advantages of other embodiments of the present invention.

The invention claimed is:

1. A computer-implemented method for dynamically adapting an exposure value for consistent interactive rendering of a volumetric medical dataset, the method comprising:
receiving a volumetric medical dataset;
providing a rendering set comprising a plurality of rendering types, wherein each rendering type within the rendering set is adapted for providing an image dataset derived from the received volumetric medical dataset, wherein the plurality of rendering types comprises at least two different rendering types;
outputting, to a display device, an image dataset pertaining to the received volumetric medical dataset according to a first rendering type within the rendering set, wherein the outputting comprises applying a first exposure value to the image dataset;
determining a second exposure value for each rendering type within the rendering set, wherein the exposure value is adapted for displaying the image dataset according to the rendering type on the display device, and wherein the second exposure value for each rendering type is determined based on the first exposure value according to the first rendering type, wherein the determining of the exposure value for each rendering type is based on a consistency requirement for changing rendering types of the image dataset output;
receiving a user input for modifying the output of the image dataset;
selecting, based on the received user input, a second rendering type with the determined second exposure value for outputting the image dataset pertaining to the received volumetric medical dataset, wherein the second rendering type differs from the first rendering type; and
outputting, to the display device, the image dataset according to the selected second rendering type with the determined second exposure value.

2. The method according to claim 1, wherein a rendering type is selected from the group consisting of: a rendering algorithm; a classification of anatomical structures comprised in the volumetric medical dataset; and a rendering preset comprising a camera view, a light source profile, a clipping plane, and/or a rendering window.

3. The method according to claim 2, wherein the rendering algorithm is selected from the group consisting of: raycasting; path tracing; interactive volume lighting, IVL; and half-angle slicing.

4. The method according to claim 1, wherein the volumetric medical dataset is received from a medical scanner.

5. The method according to claim 1, wherein the outputting of the image dataset according to the selected second rending type with the determined second exposure value is applied to the next rendered frame or a predetermined number of later rendered frames after the user input was received.

6. The method according to claim 1, wherein the determined second exposure value is based on an image metric.

7. The method according to claim 6, wherein the image metric is optimized and selected from the group consisting of: an average image luminance; a logarithmic image exposure value; a local luminance; and a perceptual metric.

8. The method according to claim 1, wherein the determined second exposure value for a frame is based on multiple previous frames, wherein a frame is a time instance of the volumetric medical dataset, and wherein the volumetric medical dataset comprises a time dimension.

9. The method according to claim 1, wherein, in the act of outputting the image dataset according to the second rendering type, a smoothing transition operation from the first rendering type to the second rendering type is applied.

10. The method according to claim 9, wherein the smoothing transition operation is selected from the group consisting of: an easing function; a gamma correction; a tone mapping operator; a custom response curve; and a relaxation parameter.

11. The method according to claim 1, wherein the user input is received by a human machine interface; a graphic user interface; a mouse; a keyboard; and/or an eye tracking device tracking the view of the user.

12. The method according to claim 1, wherein the display device comprises a see-through device, and wherein determining the second exposure value for each rendering type comprises adjusting the exposure value according to a real-world background.

13. The method according to claim 1, wherein the display device comprises a pass-through device, and wherein determining the exposure value for each rendering type comprises adjusting the exposure value applied to a real-world background and/or the output image dataset.

14. The method according to claim 1, wherein determining the second exposure value for each rendering comprises assigning weights to voxels, pixels, and/or zones of the volumetric medical dataset, render viewports, and/or to the image dataset, and determining the second exposure value for each rendering type based on the weights of the voxels, pixels, and/or zones, render viewports, and/or the image dataset.

15. The method according to claim 1, wherein the determined second exposure values for each rendering type are stored in a temporary buffer, and wherein the outputting of the image dataset according to the selected second rendering type comprises accessing the temporary buffer for retrieving the determined second exposure value.

16. The method according to claim 1, wherein a machine learning algorithm across at least part of the plurality of rendering types is employed for the determining of the second exposure values of the rendering types within the rendering set.

17. A computing device for dynamically adapting an exposure value for consistent interactive rendering of a volumetric medical dataset, the computing device comprising:
a first receiver configured to receive a volumetric medical dataset;
a processor configured to provide a rendering set comprising a plurality of rendering types, wherein each rendering type within the rendering set is adapted for providing an image dataset derived from the received volumetric medical dataset, wherein the plurality of rendering types comprises at least two different rendering types;
a graphics processing unit configured to output, to a display device, an image dataset pertaining to the received volumetric medical dataset according to a first rendering type within the rendering set, wherein the outputting comprises applying a first exposure value to the image dataset;
wherein the processor is further configured to determine a second exposure value for a second rendering type within the rendering set, wherein the second exposure value is adapted for displaying the image dataset according to the rendering type on a display device, and wherein the second exposure value for the second rendering type is determined based on the first exposure value according to the first rendering type, wherein the determining of the second exposure value for the second rendering type is based on a consistency requirement for changing rendering types of the image dataset output;
a second receiver configured to receive a user input for modifying the output of the image dataset;
wherein the processor is further configured to select, based on the received user input, the second rendering type with the determined second exposure value for outputting the image dataset pertaining to the received volumetric medical dataset, wherein the second rendering type differs from the first rendering type;
wherein the graphics processing unit is further configured for outputting, to the display device, the image dataset according to the selected second rendering type with the determined second exposure value.

18. The computer device of claim 17, further comprising:
the display device configured to receive the image dataset from the graphics processing unit;
a user interface configured to forward the user input to the second receiver.

19. The computer device of claim 17, further comprising at least one medical scanner configured to provide the volumetric medical dataset to the first receiver.

20. A non-transitory computer readable storage medium having stored thereon a computer program, that when executed by a computer, performs:
receipt of a volumetric medical dataset;
provision of a rendering set comprising a plurality of rendering types, wherein each rendering type within the rendering set is adapted for providing an image dataset derived from the received volumetric medical dataset, wherein the plurality of rendering types comprises at least two different rendering types;
output, to a display device, of an image dataset pertaining to the received volumetric medical dataset according to a first rendering type within the rendering set, wherein the outputting comprises applying a first exposure value to the image dataset;
determination of a second exposure value for each rendering type within the rendering set, wherein the exposure value is adapted for displaying the image dataset according to the rendering type on the display device, and wherein the second exposure value for each rendering type is determined based on the first exposure value according to the first rendering type, wherein the determining of the exposure value for each rendering type is based on a consistency requirement for changing rendering types of the image dataset output;
receipt of a user input for modifying the output of the image dataset;
selection, based on the received user input, of a second rendering type with the determined second exposure value for outputting the image dataset pertaining to the received volumetric medical dataset, wherein the second rendering type differs from the first rendering type; and output, to the display device, of the image dataset according to the selected second rendering type with the determined second exposure value.

* * * * *